US011310098B2

(12) United States Patent
Klous et al.

(10) Patent No.: US 11,310,098 B2
(45) Date of Patent: Apr. 19, 2022

(54) DIAGNOSING INTERMEDIARY NETWORK NODES

(71) Applicant: Cisco Technology, Inc., San Jose, CA (US)

(72) Inventors: Kevin J. Klous, Raleigh, NC (US); Jay Kemper Johnston, Raleigh, NC (US); Magnus Mortensen, Cary, NC (US); David C. White, Jr., St. Petersburg, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/897,128

(22) Filed: Jun. 9, 2020

(65) Prior Publication Data

US 2021/0385126 A1    Dec. 9, 2021

(51) Int. Cl.
| | | |
|---|---|---|
| *G06F 15/16* | (2006.01) | |
| *H04L 41/0654* | (2022.01) | |
| *H04L 41/12* | (2022.01) | |
| *H04L 69/324* | (2022.01) | |
| *H04L 69/22* | (2022.01) | |
| *H04L 43/062* | (2022.01) | |

(52) U.S. Cl.
CPC .......... *H04L 41/0654* (2013.01); *H04L 41/12* (2013.01); *H04L 43/062* (2013.01); *H04L 69/22* (2013.01); *H04L 69/324* (2013.01)

(58) Field of Classification Search
USPC ......................................... 709/227, 223, 224
See application file for complete search history.

(56) References Cited

U.S. PATENT DOCUMENTS

| | | |
|---|---|---|
| 8,793,328 B2 | 7/2014 | Lindamood et al. |
| 2017/0034003 A1 | 2/2017 | Shevach et al. |
| 2017/0161777 A1 | 6/2017 | Shuken et al. |
| 2018/0077062 A1 | 3/2018 | Park et al. |
| 2021/0119910 A1* | 4/2021 | Chen ...................... H04L 45/28 |

FOREIGN PATENT DOCUMENTS

EP    2234332 A1    9/2010

OTHER PUBLICATIONS

International Search Report and Written Opinion for PCT Application No. PCT/US2021/036466, dated Sep. 8, 2021, 13 pages.

* cited by examiner

*Primary Examiner* — Lan Dai T Truong

(74) *Attorney, Agent, or Firm* — Lee & Hayes, P.C.

(57) ABSTRACT

This disclosure describes techniques for diagnosing a presence or malfunction of a network node. In an example method, a first network node receives an indication of a diagnostic transmission originating from a second network node. The second network node further receives a forwarded transmission corresponding to the diagnostic transmission. The first network node diagnoses at least one of a presence or a malfunction of an intermediary node between the first network node and the second network node based on at least one of the indications of the diagnostic transmission or the forwarded transmission.

20 Claims, 7 Drawing Sheets

DIAGNOSING INTERMEDIARY NETWORK NODES

TECHNICAL FIELD

The present disclosure relates generally to diagnosing network nodes in a networked environment. Using various techniques described herein, the presence and functionality of a network node within a networked environment can be identified.

BACKGROUND

Modern computing networks may include multiple devices, services, and other network nodes that are interconnected by various interfaces. A network may be managed by a centralized network controller, which may track a topology of the network. That is, the network controller may track the devices within the network, as well as the connections between those devices. In order to keep the topology up-to-date as various network nodes are added or removed from the network, the network controller may rely on advertisements from the network nodes. These advertisements may include link layer discovery protocol (LLDP) messages, for example. In some cases, the topology may be manually updated by an administrator.

However, in some cases, the network controller may be unaware of nodes that have joined the network. For example, a node may be connected to the network that does not transmit the advertisements throughout the network. Accordingly, the network controller may be unable to perceive the node. In some instance, the node could be a Bump-in-the-Wire (BitW) device.

Unknown network nodes may cause a variety of problems. In some cases, an unknown network node may be benign. For example, an administrator may add a transparent firewall node to the network, without updating the topology. Further, the transparent firewall node may not advertise its presence in the network. Thus, a network controller associated with the network may be unaware of the new firewall node. In some cases, an unknown network node can disrupt the functionality of the network. For example, the firewall node may unexpectedly delay and/or drop data packets transmitted throughout the network, which could interrupt network communications.

Further, a nefarious actor may connect a malicious node to a network that remains deliberately hidden. For instance, a snooping node configured to capture and analyze private network traffic may be added to the network. In some cases, the snooping node may report the private network traffic to an external, unauthorized party, thereby creating a security vulnerability within the network. In some cases, malicious network nodes can attack vulnerabilities within the network, or even exfiltrate data outside the network. Therefore, hidden nodes pose a huge security risk to networks. Accordingly, there is a need to identify unknown network nodes within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A illustrates example signaling for a transmitting node diagnosing an intermediary node within a network. FIG. 2B illustrates alternate example signaling for a receiving node diagnosing an intermediary within a network.

FIG. 3A illustrates example signaling using an address-based diagnostic test. FIG. 3B illustrates example signaling using a corrupted data-based diagnostic test. FIG. 3C illustrates example signaling using a malicious data-based diagnostic test. FIG. 3D illustrates example signaling using a timing-based diagnostic test.

FIG. 3E illustrates example signaling using a cable length-based diagnostic test. FIG. 3F illustrates example signaling using a tagged-traffic-based diagnostic test. FIG. 3G illustrates example signaling using a mass-traffic-based diagnostic test.

DESCRIPTION OF EXAMPLE EMBODIMENTS

Overview

Figure 1:
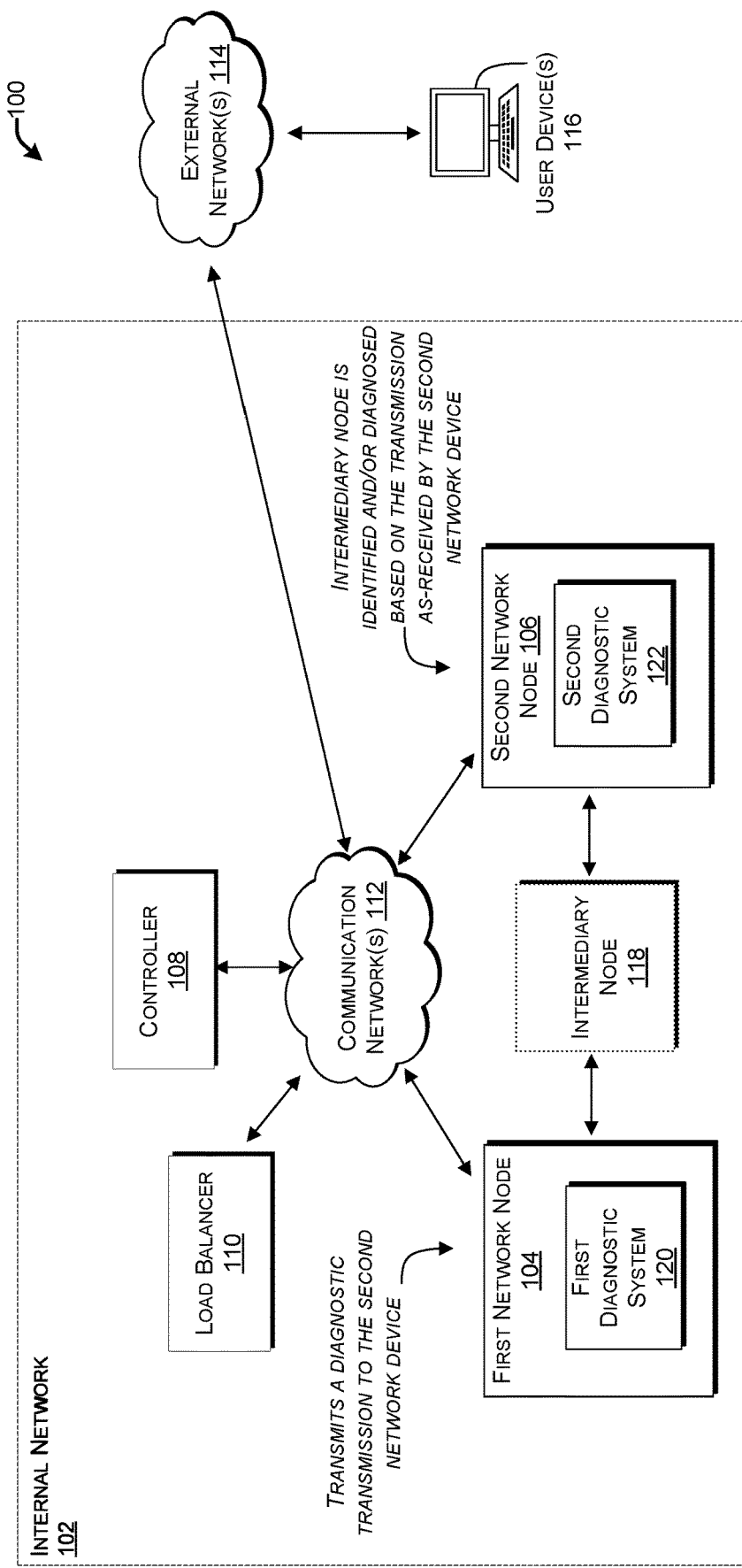
FIG. 1 illustrates an example environment for diagnosing intermediary nodes within a network.

This disclosure describes various systems, devices, and methods for diagnosing nodes within a network. In an example method, a first network node receives an indication of a diagnostic transmission originating from a second network node. The first network node receives a forwarded transmission corresponding to the diagnostic transmission. Based on at least one of the indications of the forwarded transmission, a presence and/or a malfunction of an intermediary node between the first network node and the second network node can be diagnosed.

In some instances, the method includes transmitting, to a network controller, a report indicating the presence and/or the malfunction of the intermediary node between the first network node and the second network node.

According to some examples, a header of the diagnostic transmission includes a first address and a payload of the diagnostic transmission comprises the first address and a header of the forwarded transmission includes a second address and the payload of the forwarded transmission comprises the first address. The presence and/or the malfunction of the intermediary node can be diagnosed by determining that the first address in the payload of the forwarded transmission is different than the second address in the header of the forwarded transmission.

In some examples, the diagnostic transmission includes corrupted data and uncorrupted data and the forwarded transmission includes the uncorrupted data and omits the corrupted data. For instance, diagnosing the presence and/or the malfunction of the intermediary node includes determining that the forwarded transmission omits the corrupted data. In some cases, the corrupted data is first corrupted data associated with a first layer, the diagnostic transmission further includes second corrupted data associated with a second layer, the second layer is different from the first layer, and the forwarded transmission further includes the second corrupted data. In some examples, the method further includes determining that the intermediary node is active in the first layer based on the absence of the first corrupted data in the forwarded transmission; and determining that the intermediary node is invisible in the second layer based on the presence of the second corrupted data in the forwarded transmission.

In some cases, the diagnostic transmission includes a first packet and a second packet. The first packet may include inert malicious data and the second packet may include non-malicious data. The forwarded transmission can include the second packet and omit the first packet. In some examples, diagnosing the presence and/or malfunction of the intermediary node includes determining that the forwarded transmission omits the first packet.

According to some examples, the diagnostic transmission includes a first type of data and a second type of data. The forwarded transmission can include the first type of data and the second type of data. In some cases, diagnosing the presence and/or malfunction of the intermediary node includes determining that a first time at which the first type of data in the forwarded transmission is received is different than a second time at which the second type of data in the forwarded transmission is received.

In some examples, the diagnostic transmission includes at least one first packet and an in-situ Operations, Administration, and Management (iOAM) tag indicating first contents of the at least one first packet. The forwarded transmission may include at least one second packet and the iOAM tag. In some instances, identifying the presence of the intermediary node is based, at least partly, on the iOAM tag in the forwarded transmission indicating the first contents that are different than second contents of the at least one second packet.

Example Embodiments

This disclosure describes various techniques for diagnosing network nodes within a network. According to some examples, one or more unknown network nodes may be connected between two diagnostic network nodes. The two diagnostic network nodes can perform one or more diagnostic tests by exchanging transmissions that traverse the unknown network node(s). Based on the results of the tests, one or both of the diagnostic network nodes may identify the presence of the unknown network node(s). Further, some of the tests can be used to identify one or more layers over which the unknown network node(s) are visible, such that the type of the unknown network node(s) can be identified. In various cases, one or both of the diagnostic network nodes can notify other network nodes within the network (e.g., switches, routers, load balancers, network controllers, or the like) of the presence and/or type of the unknown network node(s). Accordingly, various nodes within the network can refrain from routing data traffic through the unknown network node(s) and utilize a different path through the network. In various examples, the tests can be performed on one or more known network nodes, in order to determine whether the known network node(s) are malfunctioning. If the known network node(s) are malfunctioning, the diagnostic network nodes can indicate the malfunctioning known network node(s) to the other network nodes or to a centralized controller system.

Various implementations described herein are directed to practical improvements to network environments. Example techniques described within this disclosure enable the identification of unknown network nodes within a network, whether benign or malicious. Further, some techniques can be used to identify whether known network nodes are malfunctioning. These techniques for diagnosing the presence and/or functionality of network nodes can be used to prevent disruptions and security risks within the network.

Further, various examples described herein cannot be practically performed within the human mind. According to some examples, intermediary network nodes are diagnosed by monitoring data within diagnostic and/or forwarded transmissions through a network environment. The human mind is not equipped to perform these techniques. This disclosure provides non-abstract techniques that are fundamentally integrated into network environments.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for diagnosing intermediary nodes within a network. As illustrated, the environment 100 includes an internal network 102 that includes multiple network nodes. As used herein, the terms "node," "network node," and their equivalents, can refer to any entity within a network that can transmit packets to and/or receive packets from at least one other node. A node may be a device, a software instance, a Virtual Machine (VM), a container, a virtual process, or the like. In some examples, a node may include a grouping of devices or virtual resources, such as security groups, subnetworks, and so forth. In some examples, a node can be a client, a server, or a combination thereof. In particular, the internal network 102 may include a first network node 104 and a second network node 106. In some implementations, the network nodes within the internal network 102 may be interconnected by interfaces in accordance with a Clos topology, a spine-and-leaf topology, or the like.

Further, the internal network 102 may include a controller 108. As used herein, the terms "network controller," "controller," and their equivalents, can refer to an entity that provides centralized automation, management, policy programming, application deployment, and/or health monitoring for the fabric of the internal network 102. In some cases, the controller 108 may be embodied in an Application Policy Infrastructure Controller (APIC™). The controller 108 may be embodied in one or more network nodes within the internal network 102. The controller 108 may, in some cases, analyze data traffic through the internal network 102, receive reports that enable the controller 108 to identify the functions performed by various network nodes within the internal network 102, monitor capacity utilized within the network 102, and the like. In some cases, the controller 108 is configured to direct various functions of the first network node 104 and/or the second network node 106, as well as any other network nodes within the internal network 102. Thus, the controller 108 may optimize the utilization of network resources (e.g., communication resources, processing resources, memory resources, and the like) within the internal network 102 by controlling the network nodes.

In some cases, the internal network 102 may include a load balancer 110. As used herein, the term "load balancer," and its equivalents, can refer to an entity configured to distribute workloads across a limited amount of resources, in order to ensure that the workloads are distributed across the resources. In some examples, a load balancer may distribute data traffic over different paths through the internal network 102 to prevent one or more communication resources from being overloaded. In some instances, a load balancer may distribute the performance of tasks over different network nodes within the internal network 102, to prevent one or more of the network nodes from being overloaded. In some cases, a load balancer can be embodied by a network node (e.g., a device, a VM or application executed by at least one device, a network fabric controller, or the like). For example, a load balancer may evenly distribute network traffic across multiple switches within an example network. The load balancer 110 of FIG. 1 may be embodied in one or more network nodes within the external network 102.

The internal network 102 may include one or more internal communication networks 112 by which data can be transmitted between nodes within the internal network 102. As used herein, the term "communication network," and its equivalents, can refer to a network including one or more nodes and/or one or more interfaces over which data can be communicated. As used herein, the term "interface," and its equivalents, can refer to a connection between two nodes in a network, such as the nodes within the internal network 102. In some cases, an interface may directly connect the two nodes and/or may omit any intermediary nodes. An interface may be connected to a first port of a first network node (e.g., a physical of device and/or a virtual port of a software instance) and to a second port of a second network node. In some cases, an interface between two nodes can be a wired interface, such that a packet can be transmitted as a signal conducted through a solid medium (e.g., an Ethernet cable, a fiber-optic cable, etc.) connecting the two nodes. In some examples, an interface between nodes can be a wireless interface, such that a packet can be transmitted as a signal through a fluid medium (e.g., air, water, etc.) connecting the two nodes. A wireless interface may be defined according to a type of wave used to carry the signal (e.g., a sound wave, an electromagnetic wave, etc.) and a frequency of the wave (e.g., an ultrasonic frequency, a radio frequency, an infrared frequency, etc.). An interface may be further defined according to a particular communication protocol, which may indicate how data transmitted over the interface is modulated. Some examples of communication protocols applicable to this application include Transmission Control Protocol (TCP)/Internet Protocol (IP), Wi-Fi, Bluetooth, or the like. In various examples, the communication network(s) 112 may include at least one wired (e.g., optical fiber) network over which nodes within the internal network 102 can transfer data.

According to various implementations, the internal network 102 may be further connected to one or more external networks 114. The external network(s) 114 may be connected to the communication network(s) 112 of the internal network 102. Some examples of the external network(s) 114 include public networks, wide area networks (WANs), or combinations thereof. For example, the external network(s) 114 may include the Internet, radio access networks (RANs), wireless core networks (e.g., evolved packet core (EPC) networks, 5th generation core (5GC) networks, etc.), or the like.

One or more user devices 116 may connect to the internal network 102 via the external network(s) 114. For example, the user device(s) 116 may transmit data to, or receive data from, at least one node within the internal network 102 via the external network(s) 114. As used herein, the terms "user device," "wireless communication device," "communication device," "mobile device," "client device," and "terminal" can be used interchangeably herein to describe any user equipment (UE) that is capable of transmitting/receiving data (e.g., wirelessly) using any suitable communications/data technology, protocol, or standard, such as Global System for Mobile (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), Voice over LTE (VoLTE), Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology. In general, a UE can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like.

In some cases, the internal network 102 may include a firewall and/or some other security policy configured to filter and/or quarantine potentially malicious traffic from the external network(s) 114 and the user device(s) 116. The firewall and/or security policy may be embodied within one or more nodes of the internal network 102. In various examples, an example firewall may intercept data traffic transmitted to or through the internal network 102 (e.g., data traffic transmitted between the communication network(s) 112 and the external network(s) 114), inspect the data traffic based on one or more filter conditions, and selectively block at least a portion of the data traffic that satisfies the filter condition(s). Accordingly, the internal network 102 may be protected from malicious data traffic originating outside of the internal network 102.

The controller 108 and/or the load balancer 110 may maintain (e.g., store) a topology of the internal network 102. The topology (also referred to as a "network topology") may indicate the arrangement of network nodes in the internal network 102 and interfaces interconnecting the network nodes. In some cases, the topology can further indicate functions and/or capacities of the network nodes. In some cases, the controller 108 may identify the topology of the internal network 102 by receive one or more advertisements (e.g., messages) from the network nodes within the internal network 102. The controller 108 may utilize the topology to control the internal network 102. In some cases, the load balancer 110 may utilize the topology to balance loads between the various network nodes within the internal network 102.

The topology, however, may be outdated if additional network nodes are added to the internal network 102. In some cases, the topology can be manually updated by a network administrator. According to some implementations, the topology can be updated based on advertisements (e.g., LLDP messages) transmitted throughout the internal network 102. However, in some circumstances, the topology is not updated. For example, a network node can be added to the internal network 102 by a user that does not manually update the topology. In some cases, the network node may be benign, but nevertheless unknown to the controller 108, other devices, and/or other users. In some cases, the network node may be malicious, and the user may refrain from updating the topology for nefarious purposes. In both types of cases, the network node may cause problems to the functionality of the internal network 102.

In various implementations of the present disclosure, the first network node 104 and the second network node 106 may diagnose the presence of an intermediary node 118 within the internal network 102. In some cases, the intermediary node 118 may be a Bump in the Wire (BitW) node and/or device, such as a security appliance, a transparent firewall node, or the like. The intermediary node 118 may be transparent to visibility of the internal network 102. In some examples, the controller 108 may maintain the network topology based on communicating with all network nodes it controls and querying their LLDP databases in order to discover network nodes. LLDP is a standardized link-layer protocol defined by IEEE as Station and Media Access Control Connectivity Discovery, which is specified in IEEE 802.1AB. An example network node participating in LLDP may generate and transmit LLDP messages that advertise the node's identity (e.g., an address of the node), capabilities, and neighbor nodes. The example network node may receive LLDP messages from its neighbor nodes, which the network node can use to identify its neighbor nodes. The example network node may further store indications of its neighbor nodes in an LLDP database and report information about its neighbor nodes to the controller 108, which may update the topology based on the LLDP messages. However, in various examples, the intermediary node 118 could be an in-line Intrusion Prevention System (IPS)-type device that refrains from generating LLDP messages that would otherwise identify its presence to its neighbors within the internal network 102. Thus, the intermediary node 118 may be invisible to the internal network 102 and may be undetectable to LLDP-based techniques for defining and updating the network topology of the internal network 102. In various implementations, the controller 108 may maintain the network topology based on messages associated with other discovery protocols that are transmitted throughout the internal network 102, such as messages in accordance with the CISCO' Discovery Protocol (CDP), Link Layer Topology Discovery (LLTD) protocol, the NORTEL' Discovery Protocol (NDP), or the like. However, in these implementations, the intermediary node 118 may be similarly undetectable using other discovery protocols. Similarly, the intermediary node 118 may be undetectable using traceroute, because the intermediary node 118 may refrain from decrementing the time-to-live (TTL) data fields of traceroute packets.

The first network node 104 may include a first diagnostic system 120. The second network node 106 may include a second diagnostic system 122. The first diagnostic system 120 and/or the second diagnostic system 122 may include or be embodied within a software container, a smart network interface card (smartNIC), a virtualized function, an operating system (OS), an application, or the like, which may be part of the first network node 104 and/or the second network node 106.

In various implementations, the first network node 104 and/or the first diagnostic system 120 may participate in a handshake procedure with the second network node 106 and/or the second diagnostic system 122. For example, the first network node 104 may transmit an offer message over a particular layer (e.g., Layer 2) which advertises the capability of the first diagnostic system 120. Upon receiving the offer message, the second network node 106 may send a confirmation message over the particular layer to the first network node 104 and/or the first diagnostic system 120 that indicates a capability of the second diagnostic system 122. Accordingly, the first network node 104 and/or the first diagnostic system 120 may be synchronized with the second network node 106 and/or the second diagnostic system 122 and may subsequently test for the presence of the intermediary node 118.

According to some implementations, testing can be triggered by the controller 108. For example, the controller 108 may transmit, to the first network node 104 and/or the first diagnostic system 120, as well as to the second network node 106 and/or the second diagnostic system 122, an activation message. The activation message may be transmitted over the communication network(s) 112. Upon receiving the activation message, the first network node 104, the first diagnostic system 120, the second network node 106, and/or the second diagnostic system 122 may initiate testing to identify the presence of the intermediary node 118. In various examples, the controller 108 may transmit the activation message periodically (e.g., every 12 hours, every day, or at some other frequency).

In some implementations, the first network node 104 and the second network node 106 may be presumed adjacent within the internal network 102. As used herein, the term "adjacent," and its equivalents, can refer to nodes that are connected to each other, wherein communications between the nodes does not need to be routed between other nodes. For instance, two adjacent nodes may exchange data over a single network interface. In some cases, nodes can be adjacent in a particular network layer, such that communications between the layer-adjacent nodes do not need to be routed between other nodes within the particular network layer. Nodes within a network are "presumed adjacent" when an existing network topology (e.g., stored or otherwise maintained by controller of the network) indicates the nodes are adjacent. Nodes that are presumed adjacent may nevertheless be nonadjacent due to the presence of one or more unknown, intermediary nodes. In the example illustrated in FIG. 1, the first network node 104 and the second network node 106 may be presumed adjacent by the existing topology maintained by the controller 108. However, the first network node 104 and the second network node 106 may actually be nonadjacent within the internal network 102, due to the presence of the intermediary node 118.

To identify the presence of the intermediary node 118, the first network node 104 and/or the first diagnostic system 120 may transmit a diagnostic transmission to the second network node 106 and/or the second diagnostic system 122. As used herein, the terms "transmission," "message," and their equivalents, can refer to data transmitted between network nodes. In some cases, a transmission may include one or more protocol data units (PDUs) (e.g., data packets) transmitted between the network nodes. A transmission can be referred to a "unicast" transmission when it is transmitted by a single network node and received by a single network node. A transmission can be referred to as a "multicast" transmission when it is transmitted by a single network node and received by multiple network nodes. In various cases, the diagnostic transmission may be transmitted by the first network node 104 and/or the first diagnostic system 120 over an interface that is presumed to directly connect the first network node 104 to the second network node 106. In some examples, an indication of the diagnostic transmission may be further transmitted by the first network node 104 and/or the first diagnostic system 120 to the second network node 106 and/or the second diagnostic system 122 over the communication network(s) 112.

If the intermediary node 118 was absent from the internal network 102, then the diagnostic transmission would be received by the second network node 106 and/or the second diagnostic system 122 in an expected manner. For example, the as-received diagnostic transmission may include the same data as the as-transmitted diagnostic transmission. However, due to the presence of the intermediary node 118, the diagnostic transmission may be as-received in an unexpected manner. That is, the second network node 106 and/or the second diagnostic system 122 may receive a forwarded transmission from the intermediary node 118, which may indicate the presence of the intermediary node 118. In some cases, the second network node 106 and/or the second diagnostic system 122 may return an indication of the forwarded transmission to the first network node 104 and/or the first diagnostic system 120.

In some examples, the diagnostic transmission may include an address of the first network node 104 and/or the first diagnostic system 120. For instance, the diagnostic transmission may include at least one data packet that indicates the address of the source of the data packet. As used herein, the term "address," and its equivalents, can refer to an identifier of a node within a network that can be used to define the node as a destination of a transmission. One example of a type of address is a Media Access Control (MAC) address, which is defined according to the IEEE 802 standard. A MAC address can include 48 bits that uniquely define a node within a network. Another example of a type of address is an IP address, which is defined according to the IP communications protocol developed by the Internet Engineering Task Force (IETF). In IP version 4 (IPv4), an IP address can include 32 bits that uniquely define a node within a network. In IP version 6 (IPv6), an IP address can include 128 bits that uniquely define a node within a network. In some cases, the intermediary node 118 may automatically update the address in order to reflect the address of the intermediary node 118. Accordingly, the forwarded transmission may include a different address than the diagnostic transmission. Based on this discrepancy, the intermediary node 118 can be identified.

In some instances, the diagnostic transmission may include a mixture of uncorrupted data and corrupted data. As used herein, the term "uncorrupted data," and its equivalents, can refer to data that lacks errors and/or includes less than a threshold amount (e.g., a threshold number of bits) of errors. As used herein, the term "corrupted data," and its equivalents, can refer to data that includes one or more errors. Errors can include, for instance, a PDU transmitted over a non-common port, an acknowledgement message over a connection that has not been established, a corrupt packet header, or the like. Various network nodes may automatically filter out corrupted data that they receive. For instance, the intermediary node 118 may include the uncorrupted data in the forwarded transmission, and refrain from including to corrupted data in the forwarded transmission. Thus, the intermediary node 118 may be identified based on the absence of the corrupted data in the forwarded transmission.

In some examples, the diagnostic transmission may include a mixture of non-malicious data and malicious data. As used herein, the term "malicious data" can refer to data that is ordinarily associated with malware. The malicious data in the diagnostic transmission may be benign, such that the malicious data may refrain from exposing the internal network 102 to security risks. For instance, the malicious data may include a European Institute for Computer Antivirus Research (EICAR) test file. However, the malicious data may include one or more patterns of data that are known to be associated with malware, and therefore are likely to be filtered or quarantined by conventional firewalls and/or security platforms. In some cases, the intermediary node 118 may apply a security policy that filters out malicious data. Thus, the intermediary node 118 may include the non-malicious data in the forwarded transmission and may refrain from including the malicious data in the forwarded transmission. Due to the absence of the malicious data in the forwarded transmission, the intermediary node 118 may be identified.

According to some instances, the diagnostic transmission may include a mixture of different types of data. As used herein, the terms "type," "data type," "type of data," and their equivalents, can refer to data that is encapsulated, formatted, and/or encoded in a particular manner. Some examples of different types of data include raw Internet Protocol (IP) data, Transmission Control Protocol (TCP) data, User Datagram Protocol (UDP) data, Internet Control Message Protocol (ICMP) data, HyperText Transfer Protocol (HTTP) data, Secure Socket Layer (SSL) or Transport Layer Security (TLS) data, or the like. In some instances, the intermediary node 118 may process the different types of data at different rates. For example, the intermediary node 118 may perform deep packet inspection of a type of data included in the diagnostic transmission, which may slow down the processing of the type of data. Thus, the different types of data may be received by the second network node 106 and/or the second diagnostic system 122 in the forwarded transmission at different times. The discrepancy in the times at which the different types of data are received may be used to identify the presence of the intermediary node 118.

In various examples, the first network node 104 may perform a cable length test on an interface that is toward the second network node 106, thereby identifying a length of a first cable connecting the first network node 104 to the intermediary node 118. Similarly, the second network node 106 may perform a cable length test on an interface that is toward the first network node 104, thereby identifying a length of a second cable connecting the second network node 106 to the intermediary node 118. In some cases, the diagnostic transmission may include a data field that indicates a length of the first cable. The intermediary node 118 may forward the data field in the forwarded transmission. The second network node 106 may compare the length of the first cable indicated in the data field with the length of the second cable. The first cable and the second cable may have different lengths. The different cable lengths can be used to identify the presence of the intermediary node 118.

According to some implementations, the diagnostic transmission can include some existing data traffic transmitted from the first network node 104 to the second network node 106. The diagnostic transmission may further include one or more tags indicating the data in the diagnostic transmission. For instance, the tag(s) can include in-situ OAM (iOAM) classifiers that indicate each one of the packets in the diagnostic transmission. iOAM classifiers are defined according to the Internet Engineering Task Force (IETF) and can provide real-time telemetry data that can be embedded within live data traffic. Examples of iOAM classifiers that could be included in the tag(s) include node identification (IDs) of nodes (e.g., the first network node 104, the second network node 106, and/or the intermediary node 118) from which the diagnostic transmission is sent and/or over which the diagnostic transmission traverses, ingress and/or egress interfaces (e.g., interfaces between the first network node 104, the second network node 106, and/or the intermediary node 118), timestamps (e.g., at which the diagnostic transmission is generated and/or transmitted by the first network node 104, the second network node 106, and/or the intermediary node 118), transit-delay, transit jitter, sequence numbers, application-defined metadata, a hash value of a packet as-transmitted, or the like. In some cases, the tag(s) may indicate the presence of the intermediary node 118 directly. For example, the second network node 106 may identify the presence of the intermediary node 118 in response to identifying that a node ID of the intermediary node 118 is present in the tag(s). In some cases, the tag(s) may indicate contents (e.g., a hash of the contents, a node sending the packet, or the like) of the packet as-transmitted from the first network node 104 that may be different than the contents of the packet as-received, which may indicate the presence of the intermediary node 118. For instance, if the tag(s) indicate that the first network node 104 is the sender of the packet, but the contents (e.g., the header and/or payload) of the packet indicate something different, then the presence of the intermediary node 118 can be identified. Alternatively, the presence of the intermediary node 118 can be identified indirectly, based on the tag(s). For instance, the intermediary node 118 may drop at least some of the packets, such that the forwarded transmission omits at least some of the packets and tag(s) included in the diagnostic transmission. The tag(s) in the forwarded transmission may be used to identify that at least some of the packets were dropped. Accordingly, the presence of the intermediary node 118 can be identified due to the dropped packets.

In various examples, the diagnostic transmission can include one or more metrics indicating data traffic that was previously transmitted by the first network node 104 and addressed to the second network node 106. For instance, the diagnostic transmission may indicate a number of packets transmitted by the first network node 104 in a particular time interval. The forwarded transmission, similarly, may indicate the number of packets. Upon receiving the forwarded transmission, the second network node 106 may compare the number of data packets sent by the first network node 104 to the number of data packets received by the second network node 106. If there is a discrepancy between the number of sent and received packets, the presence of the intermediary node 118 can be identified.

In some cases, the first network node 104 and/or the first diagnostic system 120 may send multiple diagnostic transmissions to the second network node 106 and/or the second diagnostic system 122, in order to identify the presence of the intermediary node 118. For example, the diagnostic transmissions may be transmitted over different layers. As used herein, the terms "layer," "abstraction layer," and their equivalents, can refer to one or more network nodes that exchange data via a standardized communication protocol. The Open System Interconnection (OSI) model (defined by the International Standardization Organization (ISO)) is an example of a conceptual model that characterizes multiple layers with respective communication protocols. For example, Layer 1 in the OSI model is defined as the "physical" layer, and governs the transmission of bit streams over a physical medium; Layer 2 in the OSI model is defined as the "data link" layer, and governs the transmission of data between nodes that are connected by a physical layer; Layer 3 in the OSI model is defined as the "network" layer, and governs routing, addressing, and traffic control across a multi-node network; Layer 4 in the OSI model is defined as the "transport" layer, which governs the transmission of data segments throughout a network; Layer 5 in the OSI model is defined as the "session" layer, which governs continuous sessions between nodes; Layer 6 is defined as the "presentation" layer, which governs data translated between networking services and applications; and Layer 7 is defined as the "application" layer, which governs data communicated by application programming interfaces (APIs), and the like. Different layers may be associated with different types of PDUs over which data can be transmitted. For example, the PDU associated with Layer 2 may be a frame, the PDU associated with Layer 3 may be a packet, the PDU associated with Layer 4 may be a segment and/or datagram, and so on.

In some cases, the intermediary node 118 may be invisible in one layer but may be detectable in another layer. For example, the intermediary node 118 may automatically forward PDUs sent in one layer but may actively manipulate and/or delay PDUs sent in another layer. Accordingly, when the intermediary node 118 is invisible in one layer, the presence of the intermediary node 118 may be identified by testing in other layers. In some implementations, in a first test, the first network node 104 and/or the first diagnostic system 120 may transmit a first diagnostic transmission over a first layer (e.g., a frame including corrupted and uncorrupted data over Layer 2). If the presence of the intermediary node 118 is indiscernible based on the first test, a second test may be performed. In the second test, the first network node 104 and/or the first diagnostic system 120 may transmit a second diagnostic transmission over a second layer (e.g., a packet including corrupted and uncorrupted data over Layer 3). According to some cases, the second test may be used to identify the presence of the intermediary node 118. In various examples, multiple tests can be performed via diagnostic transmissions over different layers, until the presence of the intermediary node 118 is identified. In cases where the intermediary node 118 is absent, the multiple tests may be performed without confirming the presence of an intermediary node. Further, one or more layers over which the intermediary node 118 is active may be identified using these techniques, such that a type of the intermediary node 118 can be identified.

In some implementations, different types of tests can be performed in a particular order, in order to identify the presence of the intermediary node 118 in a maximally efficient manner. For example, an address-based test may be performed with the use of fewer communication resources than a corrupted data-based test, because the diagnostic and/or forwarded transmissions associated with the address-based test may include less data than the corrupted data-based test. Accordingly, the address-based test may be performed as an initial screening technique, and the corrupted data-based test may be performed subsequently to the address-based test if the address-based test is inconclusive (e.g., if the intermediary node 118 is undetected by performance of the address-based test). In various examples, a tag-based test can be performed before other tests, because the tag-based test can be performed without injecting additional data traffic into the internal network 102, thereby conserving resources of the internal network 102. In some cases, some or all of the types of tests described herein can be performed consecutively in order to effectively identify the presence of the intermediary node 118, regardless of whether the intermediary node 118 is undetectable using one or more of the types of tests.

According to various implementations, the first network node 104, the first diagnostic system 120, the second network node 106, and/or the second diagnostic system 122 may identify the presence of the intermediary node 118 based on the diagnostic transmission and the forwarded transmission. Upon identifying the presence of the intermediary node 118, the first network node 104, the first diagnostic system 120, the second network node 106, and/or the second diagnostic system 122 may update the topology based on the intermediary node 118. For example, the topology may be updated by transmitting a report indicating the intermediary node 118 to the controller 108.

In some implementations, further transmissions between the first network node 104 and the second network node 106 may be avoided, in order to avoid the intermediary node 118. For example, upon identifying the presence of the intermediary node 118, the first network node 104 may route additional data transmissions destined for the second network node 106 through the communication network(s) 112, rather than through the intermediary node 118, or vice versa. In some cases, the controller 108 may route data traffic through the communication network(s) 112, rather than through the intermediary node 118, based on the updated topology. For instance, the controller 108 could modify the underlying network fabric to avoid sending any data traffic towards the intermediary node 118.

In some cases, the presence of the intermediary node 118 may be reported to a network administrator. For instance, the network administrator may be a user associated with the user device(s) 116. The first network node 104, the second network node 106, and/or the controller 108 may transmit, to the user device(s) 116 an alert indicating the presence of the intermediary node 118. The user device(s) 116 may, in turn, output the alert to the network administrator. As a result, the network administrator may remove and/or otherwise disable the intermediary node 118 within the internal network 102, thereby preventing disruptions to the functions of the internal network 102.

In some cases, the intermediary node 118 may be known. For example, the intermediary node 118 may be indicated within the existing network topology. Nevertheless, the first network node 104 and/or the first diagnostic system 120 may transmit the diagnostic transmission, and the second network node 106 and/or the second diagnostic system 122 may receive the forwarded transmission, in order to diagnose whether the intermediary node 118 is malfunctioning. For instance, the diagnostic transmission and the forwarded transmission can be compared, in order to identify whether the intermediary node 118 is malfunctioning by dropping packets. In some cases, the first network node 104 and/or the first diagnostic system 120, the second network node 106 and/or the second diagnostic system 122, or a combination thereof, may indicate how the intermediary node 118 is malfunctioning in a report destined for the controller 108, the load balancer 110, or the user device(s) 116.

Figure 2A:
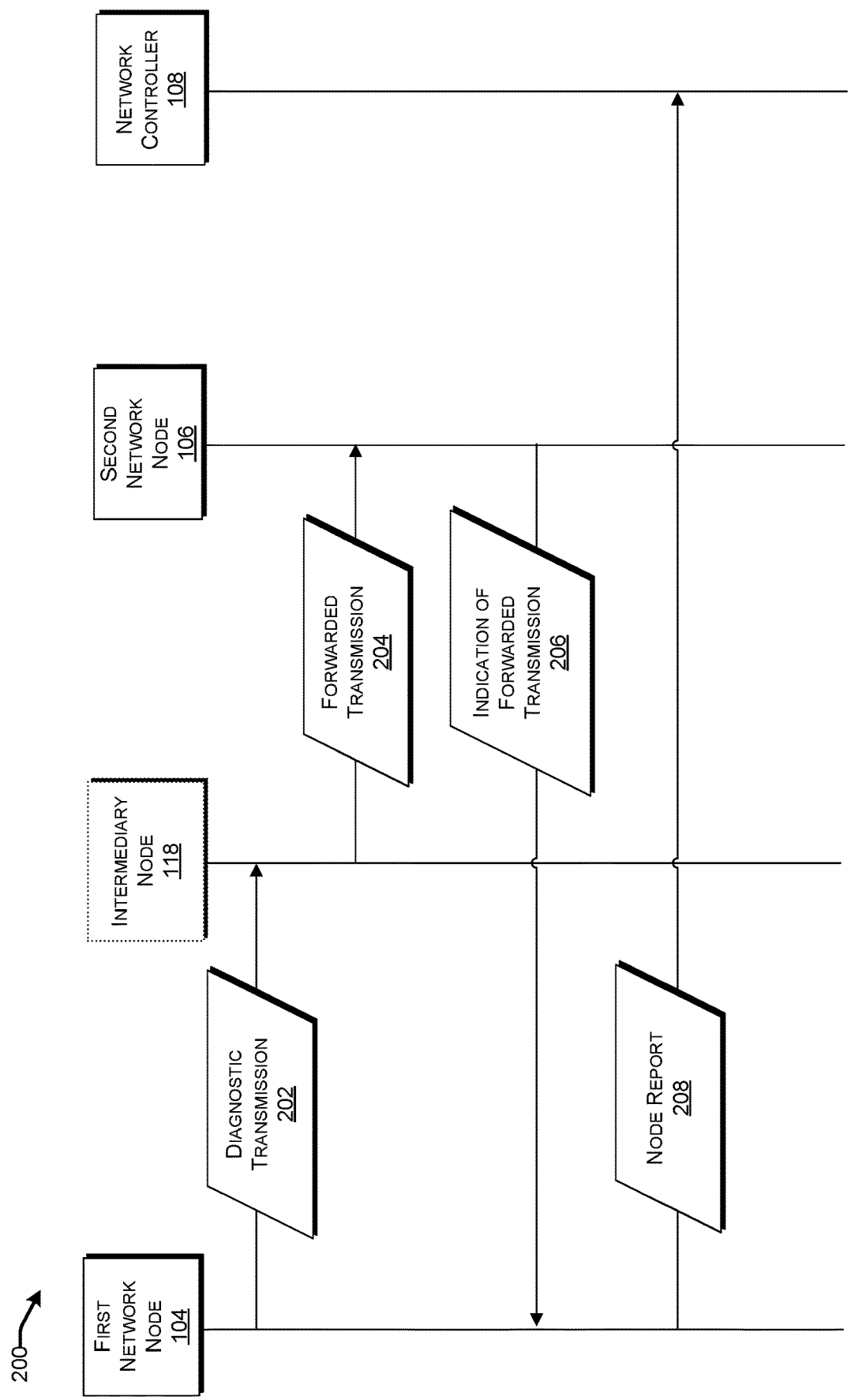
FIGS. 2A and 2B illustrate examples of signals transmitted between various elements within the environment illustrated in FIG. 1.
Figure 2B:
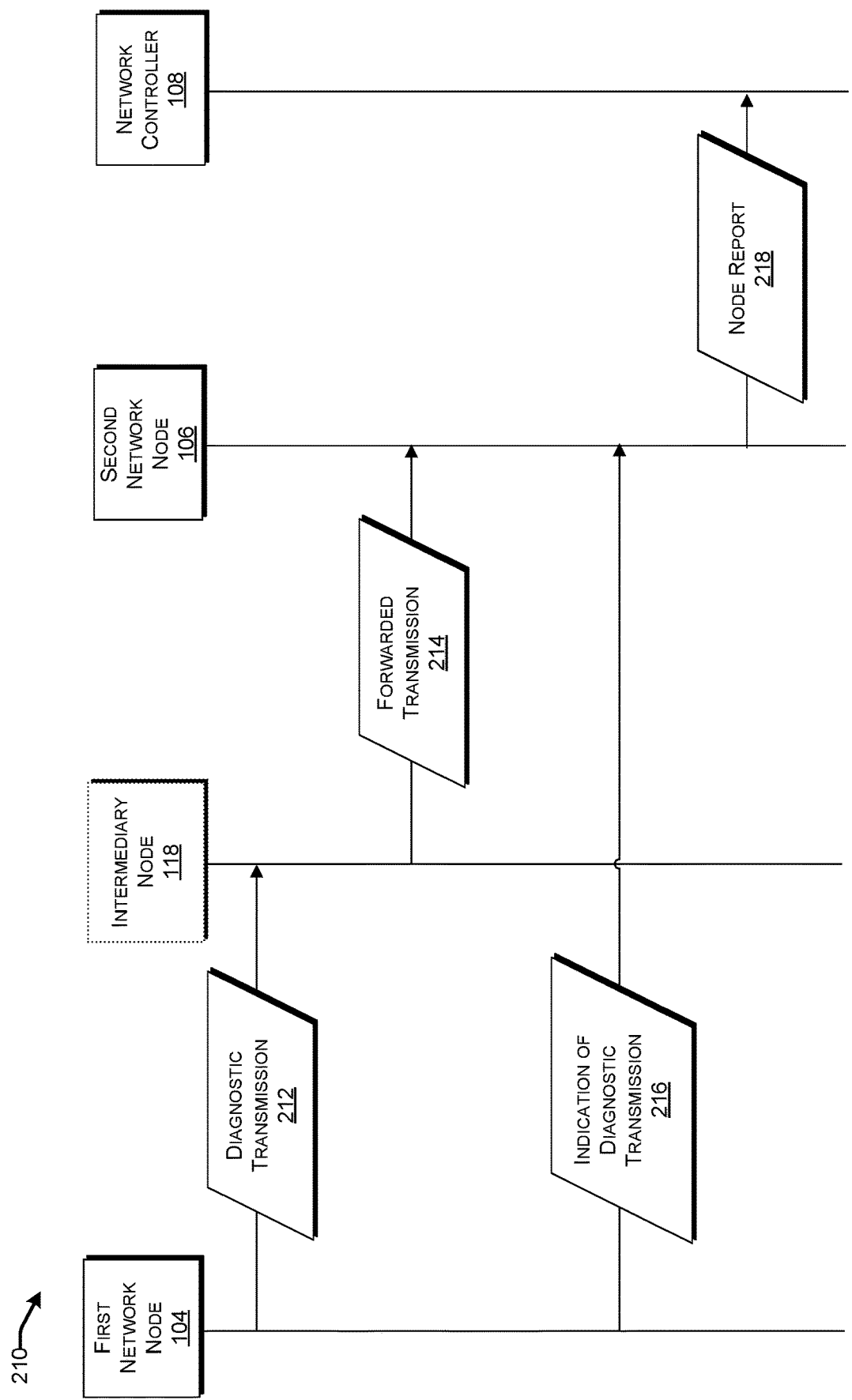

FIGS. 2A and 2B illustrate examples of signals transmitted between various elements within the environment 100 illustrated in FIG. 1. FIG. 2A illustrates example signaling 200 for a transmitting node diagnosing an intermediary node within a network. As illustrated, the signaling 200 may be performed between the first network node 104, the second network node 106, the controller 108, and the intermediary node 118, which are described above with reference to FIG. 1. In some examples, the functionality performed by the first network node 104 could be performed by the first diagnostic system 120 described above, the functionality performed by the second network node 106 could be performed by the second diagnostic system 122 described above, or a combination thereof.

The first network node 104 may transmit a diagnostic transmission 202 toward the second network node 106, which may be received by the intermediary node 118. The diagnostic transmission 202, for instance, is transmitted through the intermediary node 118. The diagnostic transmission 202 may be addressed to the second network node 106. For example, the diagnostic transmission 202 may include one or more data packets that are addressed to the second network node 106. In various cases, the diagnostic transmission 202 may selectively include data that is likely to be manipulated by the intermediary node 118. In some cases, the diagnostic transmission 202 may include data that can be used to derive whether the intermediary node 118 is manipulating data forwarded by the intermediary node 118. For instance, the diagnostic transmission 202 may include a MAC address of the first network node 104, a mixture of corrupted data and valid data, a mixture of malicious data and valid data, multiple types of data, an indication of a length of a cable over which the first network node 104 transmits the diagnostic transmission 202, iOAM tags, data traffic metrics, or the like.

The intermediary node 118 may transmit a forwarded transmission 204 to the second network node 106. In various cases, the intermediary node 118 may manipulate and/or modify the data within the diagnostic transmission 202. The forwarded transmission 204 may include at least some of the data within the diagnostic transmission 202. For instance, the forwarded transmission 204 may include valid data included in the diagnostic transmission 202. In some cases, the forwarded transmission 204 may omit some data in the diagnostic transmission. For example, the forwarded transmission 204 may omit the MAC address of the first network node 104, the corrupted data, the malicious data, at least some of the iOAM tags, or the like. According to some implementations, the forwarded transmission 204 may include data that is different than data included in the diagnostic transmission 202. For instance, the forwarded transmission 204 may include a MAC address of the intermediary node 118. In some cases, the forwarded transmission 204 may be split into different messages received by the second network node 106 at different times. For example, the forwarded transmission 204 may include a first message carrying a first type of data in the diagnostic transmission 202 and a second message carrying a second type of data in the diagnostic transmission, wherein the first and second messages are received by the second network node 106 at different times.

The second network node 106 may transmit an indication of the forwarded transmission 206 to the first network node 104. In some cases, the indication of the forwarded transmission 206 may include at least some data included in the forwarded transmission 204. According to some implementations, the indication of the forwarded transmission 206 may indicate additional details about the forwarded transmission 204. For example, the indication of the forwarded transmission 206 may indicate that the first and second messages were received by the second network node 106 at different times.

The first network node 104 may identify the presence of the intermediary node 118 based on the diagnostic transmission 202 and/or the indication of the forwarded transmission 206. The first network node 104 may transmit a node report 208 to the controller 108. The node report 208 may indicate the presence of the intermediary node 118. The controller 108 may use the node report 208 to update a network topology of a network (e.g., the internal network 102 described above with reference to FIG. 1) including the first network node 104 and the second network node 106.

Although not illustrated in FIG. 2A, in some cases, the first network node 104 may refrain from transmitting additional transmissions addressed to the second network node 106 via the intermediary node 118. Further, the first network node 104 may forward a report indicating the intermediary node 118 to the second network node 106. The second network node 106, similarly, may refrain from transmitting additional transmissions addressed to the first network node 104 via the intermediary node 118. These additional transmissions may instead be transmitted over an alternate path that connects the first network node 104 and the second network node 106.

FIG. 2B illustrates alternate example signaling 210 for a receiving node diagnosing an intermediary within a network. As illustrated, the signaling 210 may be performed between the first network node 104, the second network node 106, the controller 108, and the intermediary node 118, which are described above with reference to FIG. 1.

The first network node 104 may transmit a diagnostic transmission 212 toward the second network node 106, which may be received by the intermediary node 118. The diagnostic transmission 212 may be, for instances, transmitted through the intermediary node 118. The diagnostic transmission 212 may be addressed to the second network node 106. For example, the diagnostic transmission 212 may include one or more data packets that are addressed to the second network node 106. In various cases, the diagnostic transmission 212 may selectively include data that is likely to be manipulated by the intermediary node 118. In some cases, the diagnostic transmission 202 may include data that can be used to derive whether the intermediary node 118 is manipulating data forwarded by the intermediary node 118 in an effort to expose its existence. For instance, the diagnostic transmission 212 may include a MAC address of the first network node 104, a mixture of corrupted data and valid data, a mixture of malicious data and valid data, multiple types of data, an indication of a length of a cable over which the first network node 104 transmits the diagnostic transmission 212, iOAM tags, data traffic metrics, or the like.

The intermediary node 118 may transmit a forwarded transmission 214 to the second network node 106. In various cases, the intermediary node 118 may manipulate and/or modify the data within the diagnostic transmission 212. The forwarded transmission 214 may include at least some of the data within the diagnostic transmission 202. For instance, the forwarded transmission 214 may include valid data included in the diagnostic transmission 212. In some cases, the forwarded transmission 214 may omit some data in the diagnostic transmission. For example, the forwarded transmission 214 may omit the MAC address of the first network node 104, the corrupted data, the malicious data, the indication of the length of the cable, or the like. According to some implementations, the forwarded transmission 214 may include data that is different than data included in the diagnostic transmission 212. For instance, the forwarded transmission 214 may include a MAC address of the intermediary node 118. In some cases, the forwarded transmission 214 may be split into different messages received by the second network node 106 at different times. For example, the forwarded transmission 214 may include a first message carrying a first type of data in the diagnostic transmission 212 and a second message carrying a second type of data in the diagnostic transmission, wherein the first and second messages are received by the second network node 106 at different times.

The first network node 104 may transmit an indication of the diagnostic transmission 216 to the second network node 106. In some cases, the indication of the diagnostic transmission 216 may include at least some data included in the diagnostic transmission 212. According to some implementations, the indication of the diagnostic transmission 216 may indicate additional details about the diagnostic transmission 212. For example, the indication of the diagnostic transmission 216 may indicate that the data contained in the first and second messages was transmitted by the first network node 104 at the same time.

The second network node 106 may identify the presence of the intermediary node 118 based on the forwarded transmission 214 and/or the indication of the diagnostic transmission 216. The second network node 106 may transmit a node report 218 to the controller 108. The node report 218 may indicate the presence of the intermediary node 118. The controller 108 may use the node report 218 to update a network topology of a network (e.g., the internal network 102 described above with reference to FIG. 1) including the first network node 104 and the second network node 106.

Although not illustrated in FIG. 2B, in some cases, the second network node 106 may refrain from transmitting additional transmissions addressed to the first network node 104 via the intermediary node 118. Further, the second network node 106 may forward a report indicating the intermediary node 118 to the first network node 104. The first network node 104, similarly, may refrain from transmitting additional transmissions addressed to the second network node 106 via the intermediary node 118. These additional transmissions may instead be transmitted over an alternate path that connects the first network node 104 and the second network node 106.

FIGS. 3A to 3G illustrate various examples of diagnostic transmissions that can be used to diagnose an intermediary node within a network. In particular, FIGS. 3A to 3E illustrate examples of a diagnostic transmission 302 received by the intermediary node 118 (described above with reference to FIG. 1) and a forwarded transmission 304 transmitted by the intermediary node 118.

Figure 3A:
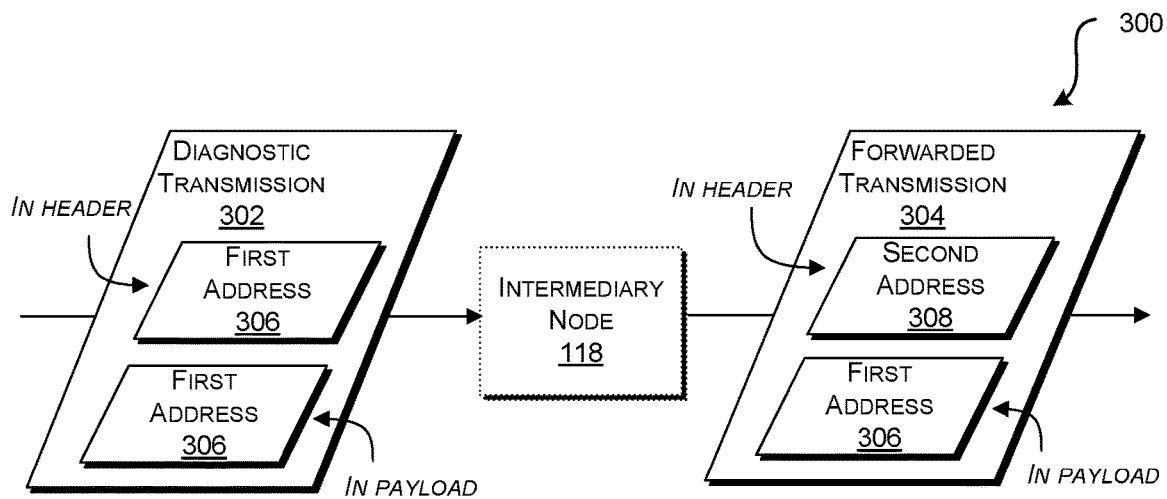
FIGS. 3A to 3G illustrate various examples of diagnostic transmissions that can be used to diagnose an intermediary node within a network.

FIG. 3A illustrates example signaling 300 using an address-based diagnostic test. As shown, the diagnostic transmission 302 may include a first address 306. In various cases, the first address 306 may be an address of the sender of the diagnostic transmission 302 (e.g., the first network node 104 and/or the first diagnostic system 120 described above with reference to FIG. 1). In various examples, the first address 306 may be a MAC address of the sender of the diagnostic transmission 302. In some cases, the first address 306 is indicated in a header of the diagnostic transmission 302 as well as in a payload of the diagnostic transmission 302.

Upon receiving the diagnostic transmission 302, the intermediary node 118 may modify the first address 306 in the header of the diagnostic transmission 302 and forward the diagnostic transmission 302 with the modified header as the forwarded transmission 304. The header of the forwarded transmission 304 may indicate a second address 308, rather than the first address 306. The second address 308 may correspond to an address of the intermediary node 118. For example, the second address 308 may be a MAC address of the intermediary node 118. However, in some cases, the intermediary node 118 may leave the first address 306 in the payload of the diagnostic transmission 302 unmodified. In various examples, the second address 308 in the header of the forwarded transmission 304 is compared to the first address 306 in the payload of the forwarded transmission 304. Due to the presence of the second address 308 in the header of the forwarded transmission 304, rather than the first address 306, the intermediary node 118 may be diagnosed. The signaling 300 illustrated in FIG. 3A can be used to identify the intermediary node 118 when the intermediary node 118 is invisible to the corresponding network at Layer 3, but is detectable at Layer 2, for instance.

Although not illustrated in FIG. 3A, in some implementations, the first address 306 can be omitted from the payload of the diagnostic transmission 302 and from the payload of the forwarded transmission 304. For example, a destination of the forwarded transmission 304 may diagnose the presence of the intermediary node 118 by comparing the second address 308 in the header of the forwarded transmission 304 to the first address 306, which may have been prestored at the destination and/or received in a message that was separate from the forwarded transmission 304. In some instances, the destination of the forwarded transmission 304 may transmit, to the source of the diagnostic transmission 302, a message indicating the second address 308 as-received in the header of the forwarded transmission 304, and the source can diagnose the presence of the intermediary node 118 by comparing the second address 308 to its own first address 306. In various implementations of the present disclosure, the presence of the intermediary node 118 can be diagnosed based on the second address 308 in the header of the forwarded transmission 304.

Figure 3B:
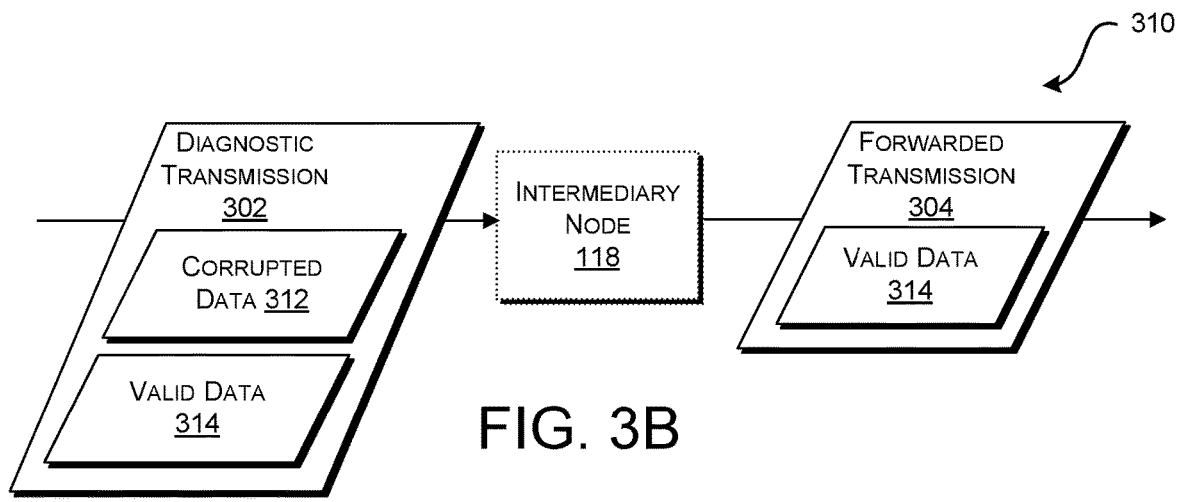

FIG. 3B illustrates example signaling 310 using a corrupted data-based diagnostic test. As shown, the diagnostic transmission 302 may include corrupted data 312 and valid data 314. As used herein, the term "valid data" may refer to data that is uncorrupted and/or non-malicious. Upon receiving the diagnostic transmission 302, the intermediary node 118 may apply a security policy that automatically removes the corrupted data 312, and the intermediary node 118 may forward the diagnostic transmission 302 as the forwarded transmission 304. The forwarded transmission 304 may include the valid data 314 but may omit the corrupted data 312. Due to the absence of the corrupted data 312 in the forwarded transmission 304, the intermediary node 118 may be diagnosed.

According to some implementations, the corrupted data 312 can include selectively corrupted values at different OSI layers. For example, the corrupted data 312 may include at least one corrupted value in Layer 2, at least one corrupted value in Layer 3, and so on. The intermediary node 118 may be configured to block and/or drop corrupted data in some OSI layers, but not others. Accordingly, the signaling 310 can be used to identify the intermediary node 118 when the intermediary node 118 is invisible in at least one of the OSI layers.

In some cases, the diagnostic transmission 302 may include one or more packets (e.g., TCP synchronize (SYN) packets) on one or more common ports (e.g., port numbers 21, 23, 25, 80, 443, and so on) and one or more non-common ports (e.g., port numbers 4713, 37829, and so on). In some cases, the non-common ports may be unofficial ports that are unregistered with the Internet Assigned Numbers Authority (IANA). The packet(s) sent over the common port(s) may be the valid data 314, and the packet(s) sent over the non-common port(s) may be the corrupted data 312.

According to some examples, the diagnostic transmission 302 may include one or more acknowledgement (ACK) messages for an unestablished TCP connection within the network. These ACK messages may be included in the corrupted data 312.

In some cases, the corrupted data 312 within the diagnostic transmission 302 may include a corrupt header field. In some instances, the diagnostic transmission 302 may include a segment (e.g., a TCP segment) with a corrupt header field. For instance, the diagnostic transmission 302 may include a corrupt TCP checksum. If the segment including the corrupt TCP checksum is excluded from the forwarded transmission 304, then the intermediary node 118 may be identified as Layer 4-aware (e.g., the intermediary node 118 may include a Layer 4-aware traffic filter). In some examples, the diagnostic transmission 302 may include a data packet (e.g., an IP packet) with a corrupt header field. For instance, a TTL field of the header may reflect a value of "0." If the data packet including the invalid TTL field is excluded from the forwarded transmission 304, then the intermediary node 118 may be identified as Layer 3-aware (e.g., the intermediary node 118 may include a Layer 3-aware traffic filter). Accordingly, in these cases, a layer associated with the intermediary node 118 can be further identified.

According to some instances, the corrupted data 312 in the diagnostic transmission 302 may include one or more packets that include a corrupt Layer 2 frame (e.g., an invalid cyclic redundancy check (CRC)). If the forwarded transmission 304 omits the corrupt Layer 2 frame, then the intermediary node 118 may be identified as a Layer 2 node. Thus, in these instances, a layer associated with the intermediary node 118 may be further identified in addition to a presence and/or malfunction of the intermediary node 118.

Figure 3C:
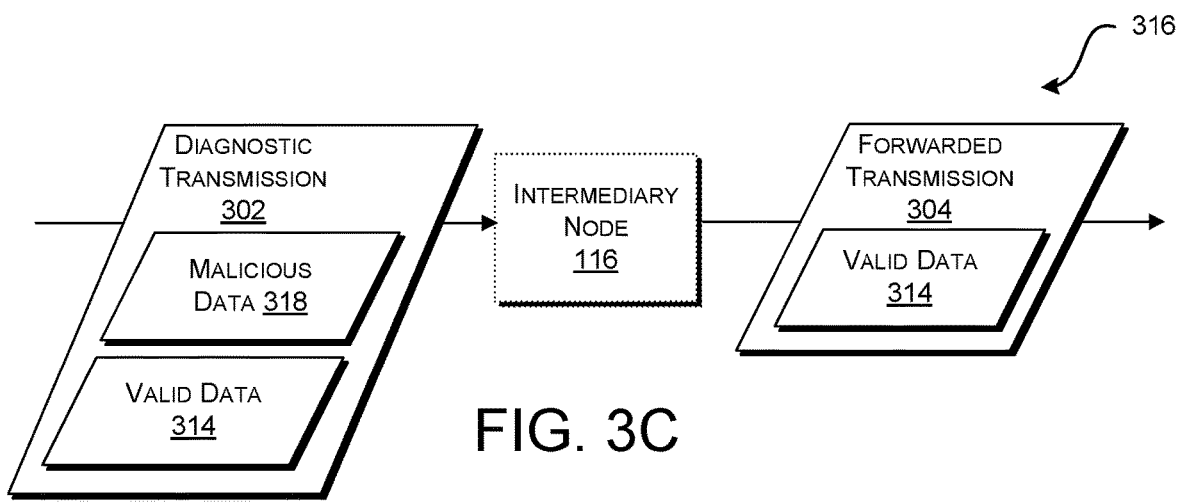

FIG. 3C illustrates example signaling 316 using a malicious data-based diagnostic test. As shown, the diagnostic transmission 302 may include malicious data 318 and the valid data 314. In various implementations, the malicious data 318 may include test files such as an EICAR test file and/or a file associated with an IPS testing suite. Upon receiving the diagnostic transmission 302, the intermediary node 118 may automatically remove the malicious data 318 and forward the diagnostic transmission 302 as the forwarded transmission 304. The forwarded transmission 304 may include the valid data 314 but may omit the malicious data 318. Due to the absence of the corrupted data 312 in the forwarded transmission 304, the intermediary node 118 may be diagnosed.

Figure 3D:
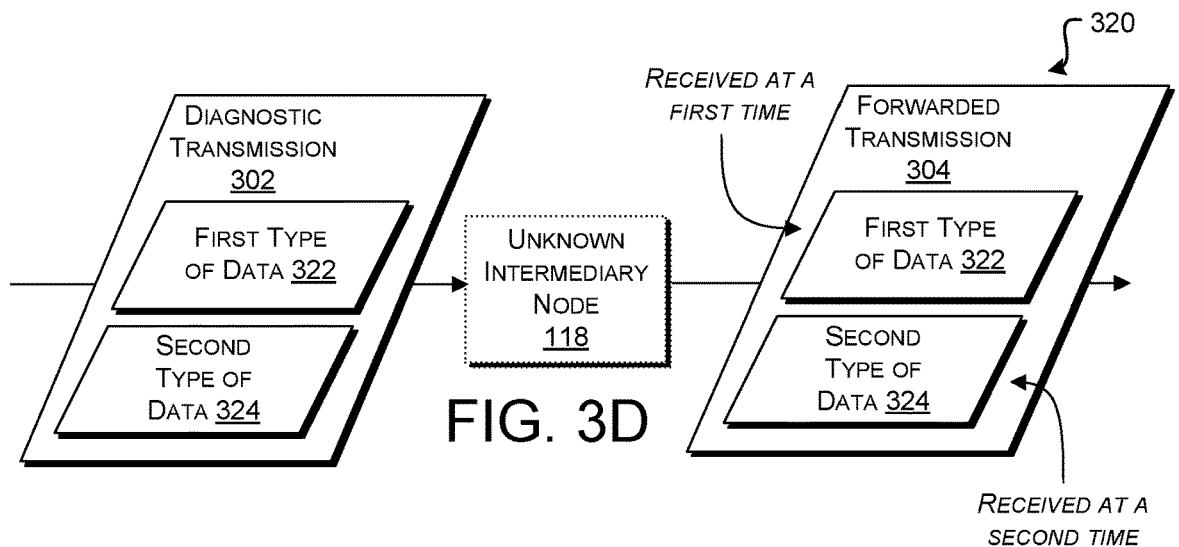

FIG. 3D illustrates example signaling 320 using a timing-based diagnostic test. As shown, the diagnostic transmission 304 may include a first type of data 322 and a second type of data 324. Upon receiving the diagnostic transmission 302, the intermediary node 118 may process the first type of data 322 differently than the second type of data 324. The intermediary node 118 may forward the diagnostic transmission 302 as the forwarded transmission 304. However, due to the differences in processing, the intermediary node 118 may forward the first type of data 322 at a different time than the second type of data 324. For example, the first type of data 322 may include passive TCP traffic (e.g., passive File Transfer Protocol (FTP) data connections) with a particular size (e.g., a length of 1000 bytes), and the second type of data 324 may include HTTP/TCP traffic with the particular size. The intermediary node 118 may selectively process and/or buffer the HTTP traffic and may automatically forward the TCP traffic without processing.

In some cases, the first type of data 322 may be received (e.g., by the second network node 106 and/or the second diagnostic system 122 described above with reference to FIG. 1) at a first time and the second type of data 324 may be received at a second time. That is, the apparent "time on the wire" (i.e., transmission time) of the first type of data 322 may be different than that of the second type of data 324. Due to the differences in times at which the first type of data 322 and the second type of data 324 are forwarded, the intermediary node 118 may be diagnosed.

Figure 3E:
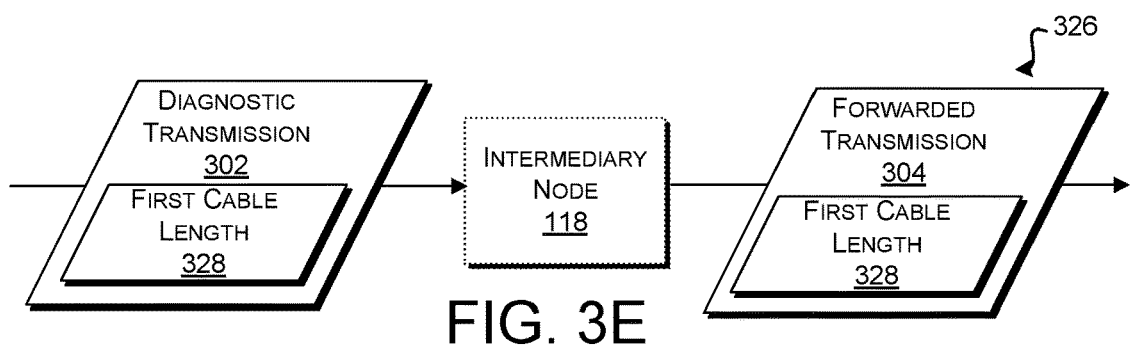

FIG. 3E illustrates example signaling 326 using a cable length-based diagnostic test. As shown, the diagnostic transmission 302 may include a first cable length 328. In various cases, the first cable length 328 may indicate a length of a cable over which the diagnostic transmission 302 is transmitted (e.g., by the first network node 104 and/or the first diagnostic system 120 described above with reference to FIG. 1). The first network node 104, for instance, may perform a cable length test toward the second network node 106, and may therefore identify a length of cable between the first network node 104 and the intermediary node 118, if present. The cable length test may be performed, for instance, by a time domain reflectometer (TDR) or a round-robin (loopback) method within the first network node 104. In some cases, the first cable length 328 may be included within a payload of a segment (e.g., a TCP segment) and/or packet (e.g., an IP packet) included in the diagnostic transmission 302

Upon receiving the diagnostic transmission 302, the intermediary node 118 may forward the first cable length 328 within the forwarded transmission 304. In various cases, the forwarded transmission 304 is received by a node (e.g., the second network node 106) that is presumed to be adjacent to the first network node 104. The second network node 106 may perform its own cable length test toward the first network node 104. The second network node 106 may identify a second cable length that is different than the first cable length 238. The second cable length may correspond to a length of cable between the second network node 106 and the intermediary node 118. Due to the difference between the first cable length 328 and the second cable length, the intermediary node 118 may be identified. Although FIG. 3E illustrates that the first cable length 328 is forwarded by the intermediary node 118, in some cases, the first cable length 328 can be communicated from the first network node 104 to the second network node 106 via an alternative path through the network (e.g., a path through the communication network(s) 112, as described above with reference to FIG. 1).

Figure 3F:
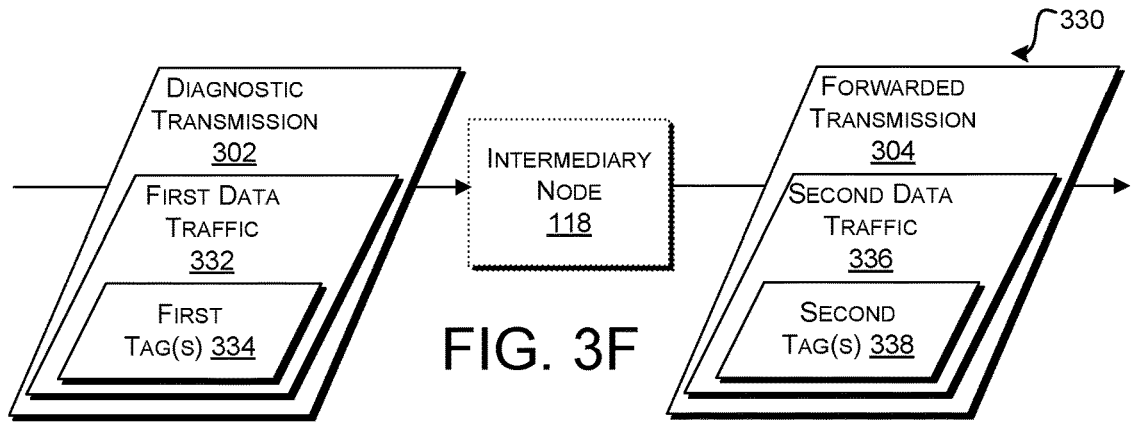

FIG. 3F illustrates example signaling 330 using a tagged-traffic-based diagnostic test. In various cases, the diagnostic transmission 302 may include existing data traffic that is traversing the network and the intermediary node 118. As illustrated, first data traffic 332 may be included within the diagnostic transmission 302. Further, the first data traffic 332 may include one or more first tags 334. The first tag(s) 334 may indicate each of the packets within the first data traffic 332. For example, the first tag(s) 334 may include iOAM data indicating the packets within the first data traffic 332. In some cases, the first tag(s) 334 may indicate timestamps of each of the packets as-transmitted, a hash of various data fields at different OSI layers, or the like.

The intermediary node 118 may modify the first data traffic 332, thereby generating second data traffic 336. The second data traffic 336, for instance, may omit one or more of the packets that is dropped by the intermediary node 118 (e.g., due to the application of a security policy associated with the intermediary node 118. The second data traffic 336 may include one or more second tags 338, which can be a subset of the first tag(s) 334. That is, the second tag(s) 338 may be an incomplete set of the first tag(s) 334. The node receiving the second data traffic 336 may identify that at least some of the packets within the first data traffic 332 are omitted from the second data traffic 336, based on the second tag(s) 338. For instance, the iOAM data within the second tag(s) 338 may be used to identify the absence of one or more packets within the second data traffic 336. By identifying that the second data traffic 336 of the forwarded transmission 304 omits at least some of the packets within the first data traffic 332 of the diagnostic transmission 302, the intermediary node 118 can be diagnosed.

Figure 3G:
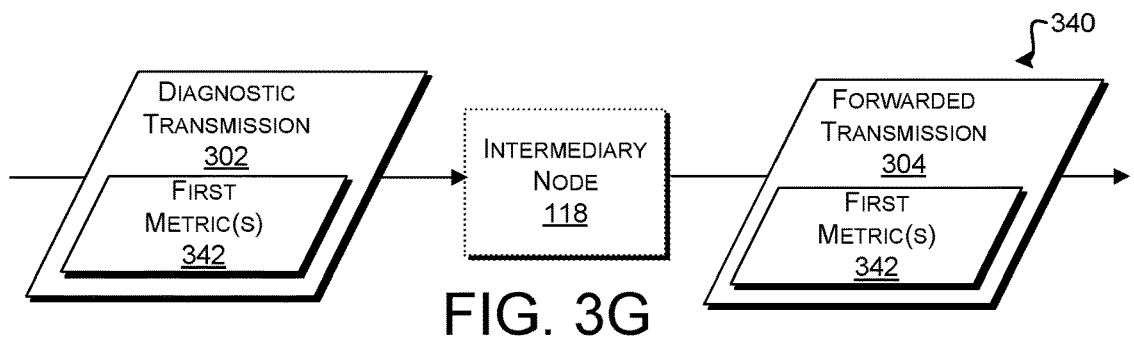

FIG. 3G illustrates example signaling 340 using a mass-traffic-based diagnostic test. As shown, the diagnostic transmission 302 may include one or more first metrics 342. The first metric(s) 342 may indicate data traffic that was previously transmitted from a first network node (e.g., the first network node 104) to a second network node (e.g., the second network node 106). In some cases, the first network node is the source of the diagnostic transmission 302 and the diagnostic transmission 302 is addressed to the second network node. The first metric(s) 342 may include, in some examples, a number of packets (e.g., HTTP packets) transmitted from the first network node to the second network node in a particular interval. The first metric(s) 342 may be included in within a payload of a segment and/or packet of the diagnostic transmission 302.

The intermediary node 118 may forward the first metric(s) 342 in the forwarded transmission 304. An entity receiving the forwarded transmission 304 may compare the first metric(s) 342 to at least one second metric corresponding to the data traffic previously received by the second network node from the first network node. In various cases, the comparison between the first metric(s) 342 and the second metric(s) may indicate that one or more packets within the data traffic were dropped during the time interval. By determining that the packet(s) were not received by the second network node, the intermediary node 118 can be diagnosed. Although FIG. 3G illustrates that the first metric(s) 342 are forwarded by the intermediary node 118, in some cases, the first metric(s) 342 can be transmitted over an alternative path connecting the first network node and the second network node (e.g., a path through the communication network(s) 112 described above with reference to FIG. 1).

Figure 4:
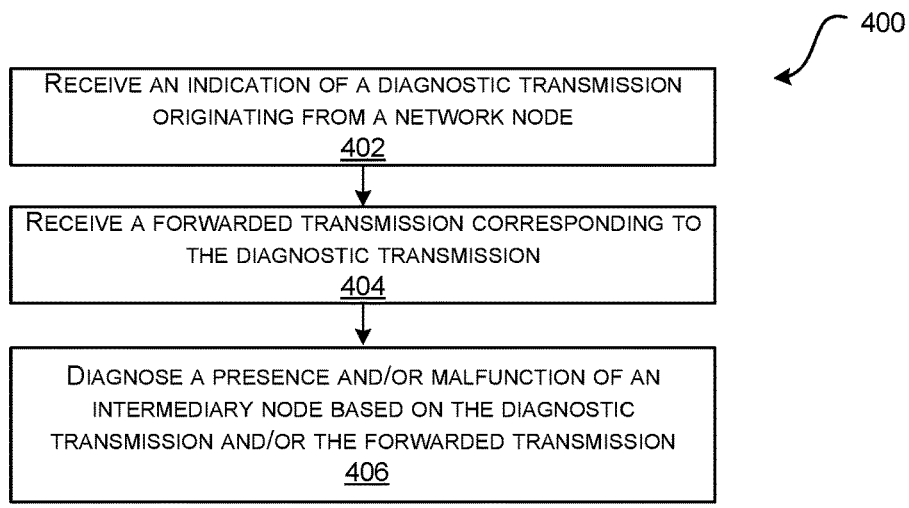
FIG. 4 illustrates an example process for diagnosing a presence and/or a malfunction of an intermediary node within a network.

FIG. 4 illustrates an example process 400 for diagnosing a presence and/or a malfunction of an intermediary node within a network. In various examples, the process 400 may be performed by the second network node 106 and/or the second diagnostic system 122, which are described above with reference to FIG. 1.

At 402, an indication of a diagnostic transmission originating from a network node may be received. The network node from which the diagnostic transmission originates may be the first network node 104 and/or the first diagnostic system 120, as described above with reference to FIG. 1. In some cases, the indication can include a transmission that is received over at least one communication network (e.g., the communication network(s) 112 described above with reference to FIG. 1). In some instances, the indication can include a transmission that is forwarded by an intermediary node (e.g., the intermediary node 118 described above with reference to FIG. 1).

In various cases, the diagnostic transmission may selectively include data that is likely to be manipulated by the intermediary node. In some cases, the diagnostic transmission may include data that can be used to derive whether the intermediary node is manipulating data forwarded by the intermediary node. For instance, the diagnostic transmission may include a MAC address of the node originating the diagnostic transmission, a mixture of corrupted data and valid data, a mixture of malicious data and valid data, multiple types of data, an indication of a length of a cable over which the diagnostic transmission is transmitted, iOAM tags, data traffic metrics, or the like.

At 404, a forwarded transmission corresponding to the diagnostic transmission may be received. In various cases, the intermediary node may manipulate and/or modify the data within the diagnostic transmission. The forwarded transmission may include at least some of the data within the diagnostic transmission. For instance, the forwarded transmission may include valid data included in the diagnostic transmission. In some cases, the forwarded transmission may omit some data in the diagnostic transmission. For example, the forwarded transmission may omit the MAC address of the first network node, the corrupted data, the malicious data, at least some of the iOAM tags, or the like. According to some implementations, the forwarded transmission may include data that is different than data included in the diagnostic transmission. For instance, the forwarded transmission may include a MAC address of the intermediary node. In some cases, the forwarded transmission may be split into different messages received by the second network node at different times. For example, the forwarded transmission may include a first message carrying a first type of data in the diagnostic transmission and a second message carrying a second type of data in the diagnostic transmission, wherein the first and second messages are received at different times. In some cases, the forwarded transmission includes the cable length and/or the data traffic metrics of the diagnostic transmission.

At 406, a presence and/or malfunction of the intermediary node may be diagnosed based on the diagnostic transmission and/or the forwarded transmission. For example, the presence and/or malfunction of the intermediary node can be identified based on the discrepancy between the MAC address indicated in the diagnostic transmission and the MAC address indicated in the forwarded transmission. In some cases, the presence and/or malfunction of the intermediary node can be identified based on the absence of the corrupted data and/or the absence of the malicious data in the forwarded transmission. In various instances, the presence and/or malfunction of the intermediary node can be identified based on a discrepancy of times at which different data types within the forwarded transmission are received. In some cases, the presence and/or malfunction of the intermediary node can be identified based on a difference between the cable length indicated in the forwarded transmission and a cable length calculated by the entity performing the process 400. In various examples, the presence and/or malfunction of the intermediary node can be determined based on the iOAM tag(s) within the forwarded transmission. According to some instances, the presence and/or malfunction of the intermediary node can be identified based on data traffic metrics within the forwarded transmission.

In some cases, the presence and/or malfunction of the intermediary node may be further reported to another node within the network. For example, the presence and/or malfunction can be reported to a network controller, which may perform various functions that can address the presence and/or malfunction. In some cases, data traffic can be routed through the network in such a way that it avoids the intermediary network. In some examples, an administrator can be notified of the presence and/or malfunction of the intermediary node, and can manually address the presence and/or malfunction.

Figure 5:
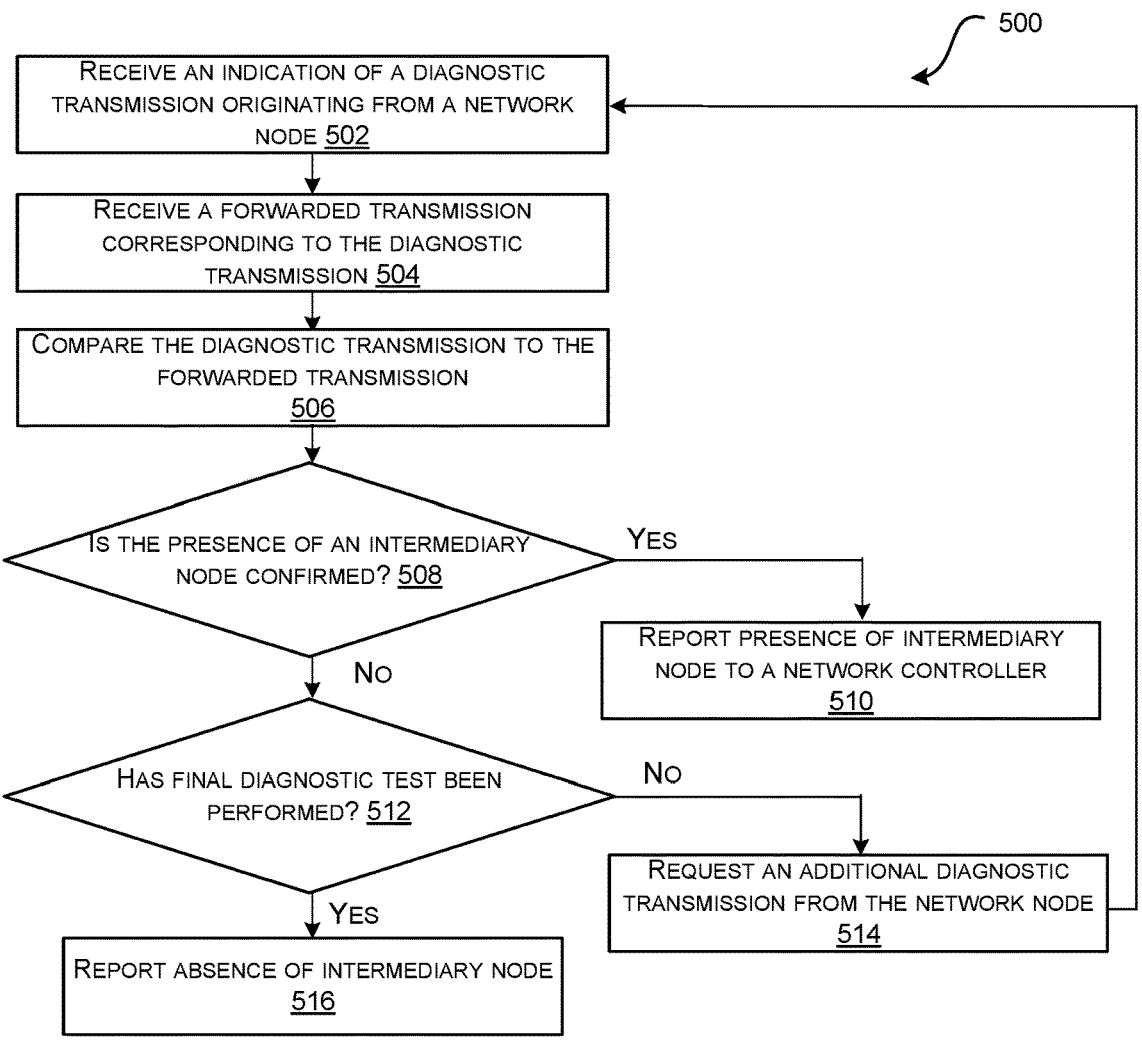
FIG. 5 illustrates an example process for identifying whether an intermediary node is present within a network.

FIG. 5 illustrates an example process 500 for identifying whether an intermediary node is present within a network. In various examples, the process 500 may be performed by the second network node 106 and/or the second diagnostic system 122, which are described above with reference to FIG. 1.

At 502, an indication of a diagnostic transmission may be received from a network node. The network node from which the diagnostic transmission originates may be the first network node 104 and/or the first diagnostic system 120, as described above with reference to FIG. 1. In some cases, the indication can include a transmission that is received over at least one communication network (e.g., the communication network(s) 112 described above with reference to FIG. 1). In some instances, the indication can include a transmission that is forwarded by an intermediary node (e.g., the intermediary node 118 described above with reference to FIG. 1).

In various cases, the diagnostic transmission may selectively include data that is likely to be manipulated by the intermediary node, if present. In some cases, the diagnostic transmission may include data that can be used to derive whether the intermediary node is manipulating data forwarded by the intermediary node. For instance, the diagnostic transmission may include a MAC address of the node originating the diagnostic transmission, a mixture of corrupted data and valid data, a mixture of malicious data and valid data, multiple types of data, an indication of a length of a cable over which the diagnostic transmission is transmitted, iOAM tags, data traffic metrics, or the like.

At 504, a forwarded transmission corresponding to the diagnostic transmission may be received. In various cases, the intermediary node, if present, may manipulate and/or modify the data within the diagnostic transmission. The forwarded transmission may include at least some of the data within the diagnostic transmission. For instance, the forwarded transmission may include valid data included in the diagnostic transmission. In some cases, the forwarded transmission may omit some data in the diagnostic transmission. For example, the forwarded transmission may omit the MAC address of the first network node, the corrupted data, the malicious data, at least some of the iOAM tags, or the like. According to some implementations, the forwarded transmission may include data that is different than data included in the diagnostic transmission. For instance, the forwarded transmission may include a MAC address of the intermediary node. In some cases, the forwarded transmission may be split into different messages received by the second network node at different times. For example, the forwarded transmission may include a first message carrying a first type of data in the diagnostic transmission and a second message carrying a second type of data in the diagnostic transmission, wherein the first and second messages are received at different times. In some cases, the forwarded transmission includes the cable length and/or the data traffic metrics of the diagnostic transmission.

At 506, the diagnostic transmission may be compared to the forwarded transmission. For example, one or more data fields within the diagnostic transmission may be compared to one or more data fields within the forwarded transmission. In some cases, packets within the diagnostic transmission can be compared to one or more packets within the forwarded transmission.

At 508, the process 500 includes determining whether the presence of an intermediary node is confirmed. In various cases, the presence of the intermediary node may be confirmed based on a discrepancy between the diagnostic transmission and the forwarded transmission. For instance, if a MAC address in the diagnostic transmission is different than a MAC address in the forwarded transmission, the presence of the intermediary node may be confirmed. Otherwise, if the diagnostic transmission and the forwarded transmission include the same MAC address, then the presence of the intermediary node may be unconfirmed.

In some examples, the presence of the intermediary node may be confirmed based on the absence of corrupted and/or malicious data within the forwarded transmission, despite the inclusion of the corrupted and/or malicious data within the diagnostic transmission. In some cases, only a portion of the corrupted and/or malicious data is excluded from the forwarded transmission. For example, a first portion of the corrupted and/or malicious data that corresponds to a first OSI layer may be included in the forwarded transmission, whereas a second portion of the corrupted and/or malicious data that corresponds to a second OSI layer may be excluded from the forwarded transmission. Thus, the intermediary node may be further confirmed to be active on the first OSI layer. However, if the corrupted and/or malicious data is included in the forwarded transmission, then the presence of the intermediary node may be unconfirmed.

In some cases, the presence of the intermediary node may be confirmed based on a discrepancy of times at which different types of data within the forwarded transmission are received. For instance, the diagnostic transmission may include the different types of data transmitted at the same time (or within a threshold time period of each other). However, if the different types of data are received at different times (or at different times separated by greater than the threshold time period), then the presence of the intermediary node may be confirmed. If, on the other hand, the different types of data are received at the same time (e.g., or within the threshold time period of each other), then the presence of the intermediary node may be unconfirmed.

According to various examples, the presence of the intermediary node may be confirmed based on a discrepancy between tags (e.g., iOAM tags) included in the diagnostic transmission and tags included in the forwarded transmission. In some cases, the absence of one or more packets from the forwarded transmission, which were included in the diagnostic transmission, can be identified based on the tags in the diagnostic transmission, the tags in the forwarded transmission, or a combination thereof. However, if the tags indicate that all of the packets in the diagnostic transmission are included in the forwarded transmission, then the presence of the intermediary node may be unconfirmed.

If the presence of the intermediary node is confirmed at 508, then the presence of the intermediary node is reported at 510. For example, a report indicating the presence of the intermediary node may be generated and transmitted to a network controller (e.g., the controller 108 described above with reference to FIG. 1), some other node within the corresponding network, or to an external device (e.g., the user device(s) 116 described above with reference to FIG. 1). In some cases, the type of the intermediary node (e.g., the OSI layer(s) on which the intermediary node is active) can be further indicated in the report. The report may be a transmission, in various cases.

If the presence of the intermediary node is not confirmed at 508, then the process 500 includes determining whether the final diagnostic test has been performed at 512. In various cases, a protocol specifying a particular order of diagnostic tests may be followed by the entity performing the process 500. The protocol may be predetermined based on various factors. For instance, diagnostic tests including the injection of a minimal amount of data within the network may be performed before diagnostic tests including the injection of a greater amount of data. In some cases, relatively simple diagnostic tests (e.g., the address-based test) may be performed before more complex diagnostic tests (e.g., the corrupted data-based and/or the malicious data-based tests). At 512, it may be determined whether the final diagnostic test within the protocol has been followed.

If the final diagnostic test is determined to have not been performed at 512, then the process 500 proceeds to 514. At 514, an additional diagnostic transmission is received from the network node. In some cases, the entity performing the process 500 may transmit a message requesting the additional diagnostic transmission. The diagnostic transmission may correspond to a next diagnostic test within the protocol. Further, after execution of 514, the process 500 returns to 502, based on the execution of the next diagnostic test.

If, however, the final diagnostic test is determined to have been performed at 512, the process proceeds to 516. At 516, the absence of the intermediary node is reported. For instance, a message indicating the absence of the intermediary node may be generated and transmitted to another network node and/or at least one external device. In some cases, the absence of the intermediary node can be reported to the network controller.

Figure 6:
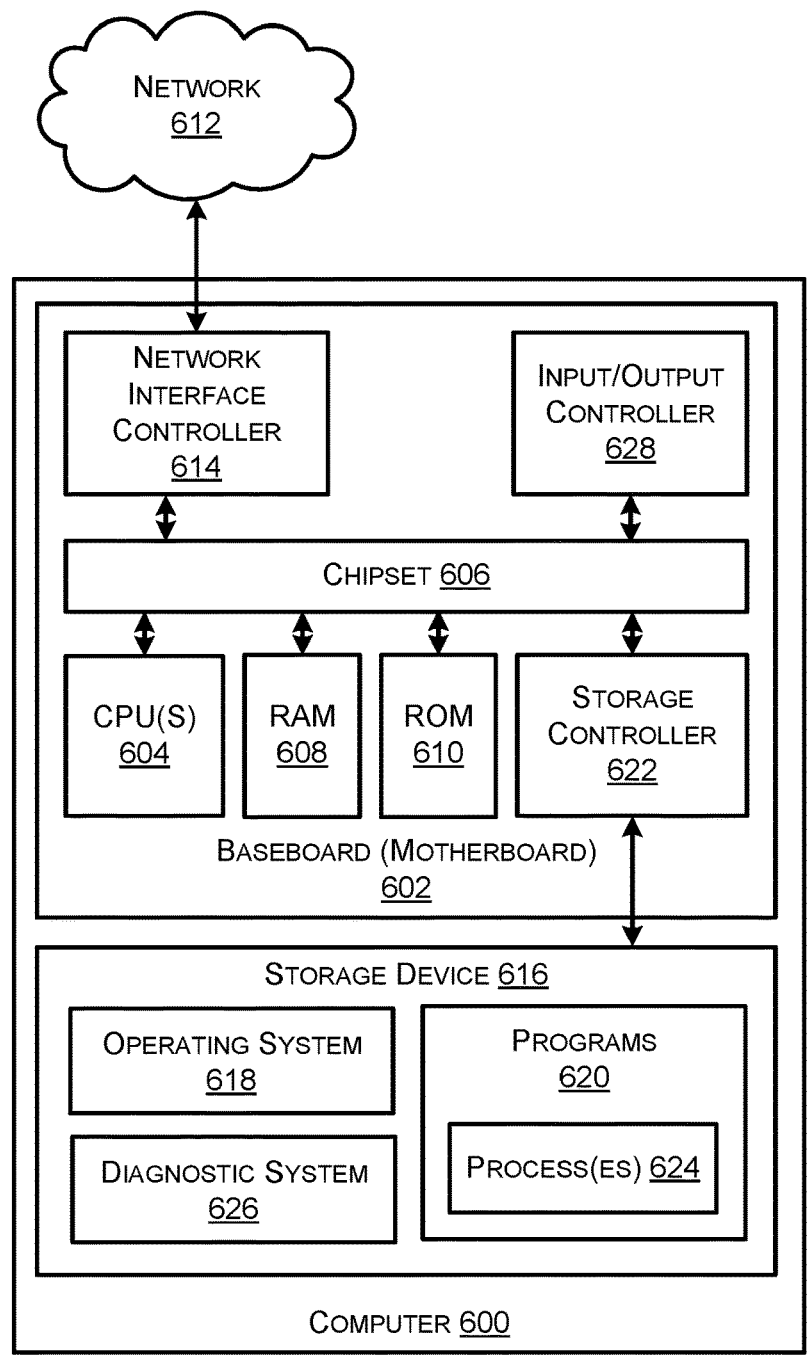
FIG. 6 shows an example computer architecture for a computer capable of executing program components for implementing the functionality described herein.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may, in some examples, correspond to a network node (e.g., the first network node 104 and/or the second network node 106) described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 612. The chipset 606 can include functionality for providing network connectivity through a network interface controller (NIC) 614, such as a gigabit Ethernet adapter. The NIC 614 is capable of connecting the computer 600 to other computing devices over the network 612. It should be appreciated that multiple NICs 614 can be present in the computer 600, connecting the computer 600 to other types of networks and remote computer systems. In some instances, the NICs 614 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. The storage device 616 can be connected to the computer 600 through a storage controller 622 connected to the chipset 606. The storage device 616 can consist of one or more physical storage units. The storage controller 616 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the mass storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX' operating system. According to another embodiment, the operating system includes the WINDOWS' SERVER operating system from MICROSOFT Corporation of Redmond, Wash. According to further embodiments, the operating system can comprise the UNIX' operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 616 stores programs 620, which may include one or more processes 624, as well as a diagnostic system 626 (e.g., the first diagnostic system 120 and/or the second diagnostic system 122 described above with reference to FIG. 1). The process(es) 624 may include instructions that, when executed by the CPU(s) 604, cause the computer 600 and/or the CPU(s) 604 to perform one or more operations.

The computer 600 can also include one or more input/output controllers 628 for receiving and processing input from a number of input devices, such as a keyboard, a mouse, a touchpad, a touch screen, an electronic stylus, or other type of input device. Similarly, an input/output controller 628 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
    receiving, by a first network node, an indication of a diagnostic transmission originating from a second network node, the diagnostic transmission comprising corrupted data and uncorrupted data;
    receiving, by the first network node, a forwarded transmission corresponding to the diagnostic transmission; and
    diagnosing, by the first network node, at least one of a presence or a malfunction of an intermediary node between the first network node and the second network node based on determining that the forwarded transmission omits the corrupted data.

2. The method of claim 1, further comprising:
    transmitting, to a network controller, a report indicating the at least one of the presence or the malfunction of the intermediary node between the first network node and the second network node.

3. The method of claim 1, wherein a header of the diagnostic transmission comprises a first address and a payload of the diagnostic transmission comprises the first address,
    wherein a header of the forwarded transmission comprises a second address and the payload of the forwarded transmission comprises the first address, and
    wherein diagnosing the at least one of the presence or the malfunction of the intermediary node is further based on determining that the first address in the payload of the forwarded transmission is different than the second address in the header of the forwarded transmission.

4. The method of claim 1, wherein the corrupted data is first corrupted data associated with a first layer,
    wherein the diagnostic transmission further comprises second corrupted data associated with a second layer, the second layer being different from the first layer, the forwarded transmission further comprising the second corrupted data, and
    wherein the method further comprises:
        determining that the intermediary node is active in the first layer based on an absence of the first corrupted data in the forwarded transmission; and
        determining that the intermediary node is invisible in the second layer based on a presence of the second corrupted data in the forwarded transmission.

5. The method of claim 1, wherein the diagnostic transmission comprises a first packet and a second packet, the first packet comprising inert malicious data and the second packet comprising non-malicious data,
    wherein the forwarded transmission comprises the second packet and omits the first packet, and
    wherein diagnosing the at least one of the presence or the malfunction of the intermediary node is further based on determining that the forwarded transmission omits the first packet.

6. The method of claim 1, wherein the diagnostic transmission comprises a first type of data and a second type of data,
    wherein the forwarded transmission comprises the first type of data and the second type of data, and
    wherein diagnosing the at least one of the presence or the malfunction of the intermediary node is further based on determining that a first time at which the first type of data in the forwarded transmission is received is different than a second time at which the second type of data in the forwarded transmission is received.

7. The method of claim 1, wherein the diagnostic transmission comprises at least one first packet and an in-situ Operations, Administration, and Management (iOAM) tag indicating first contents of the at least one first packet,
    wherein the forwarded transmission comprises at least one second packet and the iOAM tag, and
    wherein identifying the presence of the intermediary node is further based on the iOAM tag in the forwarded transmission indicating the first contents that are different than second contents of the at least one second packet.

8. The method of claim 1, further comprising:
    identifying, by the first network node, a first length of a first cable connecting the first network node to the intermediary node,
    wherein the forwarded transmission indicates a second length of a second cable connecting the second network node to the intermediary node, and
    wherein determining at least one of the presence or the malfunction of the intermediary node is further based on determining that the first length is different than the second length.

9. The method of claim 1, further comprising:
    receiving, by the first network node, one or more first packets that were transmitted by the second network node during a time interval,
    wherein the forwarded transmission indicates at least one metric indicating second packets transmitted, by the second network node, to the first network node over the time interval, the second packets including the one or more first packets and one or more third packets, and wherein determining at least one of the presence or the malfunction of the intermediary node is further based on determining that the one or more first packets omit the one or more third packets based on the at least one metric.

10. A system, comprising
at least one processor; and
one or more non-transitory media storing instructions that, when executed by the system, cause the system to perform operations comprising:
  receiving, by a first network node, an indication of a diagnostic transmission originating from a second network node, the diagnostic transmission comprising a first type of data and a second type of data;
  receiving, by the first network node, a forwarded transmission corresponding to the diagnostic transmission, the forwarded transmission comprising the first type of data and the second type of data; and
  identifying a presence of an intermediary node between the first network node and the second network node based on determining that a first time at which the first type of data in the forwarded transmission is received is different than a second time at which the second type of data in the forwarded transmission is received.

11. The system of claim 10, wherein the operations further comprise:
  transmitting, to a network controller, a report indicating the presence of the intermediary node between the first network node and the second network node.

12. The system of claim 10, wherein the diagnostic transmission comprises a first address,
  wherein the forwarded transmission comprises a second address, and
  wherein identifying the presence of the intermediary node comprises determining that the first address is different than the second address.

13. The system of claim 10, wherein the diagnostic transmission comprises corrupted data and uncorrupted data,
  wherein the forwarded transmission comprises the uncorrupted data and omits the corrupted data, and
  wherein identifying the presence of the intermediary node is further based on determining that the forwarded transmission omits the corrupted data.

14. The system of claim 13, the diagnostic transmission being a first diagnostic transmission, the forwarded transmission being a first forwarded transmission, the corrupted data being first corrupted data, and the uncorrupted data being first uncorrupted data, the operations further comprising:
  receiving, by the first network node, an indication of a second diagnostic transmission originating from the second network node, the first diagnostic transmission being associated with a first layer that is different than a second layer associated with the second diagnostic transmission, the second diagnostic transmission comprising second corrupted data and second uncorrupted data;
  receiving, by the first network node, a second forwarded transmission corresponding to the second diagnostic transmission;
  determining that the second forwarded transmission comprises the second corrupted data and the second uncorrupted data; and
  in response to determining that the second forwarded transmission comprises the second corrupted data and the second uncorrupted data, transmitting, by the first network node, a request for the indication of the first diagnostic transmission.

15. The system of claim 10, wherein the diagnostic transmission comprises benign malicious data and non-malicious data,
  wherein the forwarded transmission comprises the non-malicious data and omits the benign malicious data, and
  wherein identifying the presence of the intermediary node is further based on determining that the forwarded transmission omits the benign malicious data.

16. The system of claim 10, wherein the diagnostic transmission comprises at least one first packet, at least one first in-situ Operations, Administration, and Management (iOAM) tag associated with the at least one first packet, at least one second packet, and at least one second iOAM tag associated with the at least one second packet,
  wherein the forwarded transmission comprises the at least one first packet and the at least one first iOAM tag and omits the at least one second packet and the at least one second iOAM tag, and
  wherein identifying the presence of the intermediary node is further based on identifying that the forwarded transmission omits the at least one first packet by analyzing the at least one second iOAM tag.

17. The system of claim 10, wherein the operations further comprise:
  identifying, by the first network node, a first length of a first cable connecting the first network node to the intermediary node,
  wherein the forwarded transmission indicates a second length of a second cable connecting the second network node to the intermediary node, and
  wherein identifying the presence of the intermediary node is further based on determining that the first length is different than the second length.

18. The system of claim 10, wherein the operations further comprise:
  receiving, by the first network node, one or more first packets that were transmitted by the second network node during a time interval,
  wherein the forwarded transmission indicates at least one metric indicating second packets transmitted, by the second network node, to the first network node over the time interval, the second packets including the one or more first packets and one or more third packets, and
  wherein identifying the presence of the intermediary node is further based on determining that the one or more first packets omit the one or more third packets based on the at least one metric.

19. A first network node, comprising
at least one processor; and
one or more non-transitory media storing instructions that, when executed by the first network node, cause the first network node to perform operations comprising:
  receiving a first indication of a first diagnostic transmission originating from a second network node, the first diagnostic transmission comprising a Media Access Control (MAC) address of the second network node;
  receiving a first forwarded transmission corresponding to the first diagnostic transmission;
  determining that the first forwarded transmission comprises the MAC address of the second network node;
  in response to determining that the first forwarded transmission comprises the MAC address, transmitting, to the second network node, a request for a second diagnostic transmission;

receiving a second indication of a second diagnostic transmission originating from the second network node, the second diagnostic transmission comprising corrupted data in multiple Open Systems Interconnection (OSI) layers;

receiving a second forwarded transmission corresponding to the second diagnostic transmission, the second forwarded transmission indicating an omission of at least a portion of the corrupted data;

identifying a presence of an intermediary node between the first network node and the second network node based on the omission of the at least the portion of the corrupted data from the second forwarded transmission;

transmitting, to a network controller, a report indicating the presence of the intermediary node.

20. The first network node of claim 19, wherein the operations further comprise:

determining that the second forward transmission comprises a first portion of the corrupted data in a first OSI layer among the multiple OSI layers and that the second forward transmission omits a second portion of the corrupted data in a second OSI layer among the multiple OSI layers, wherein the report further indicates that the intermediary node is active in the second OSI layer.

* * * * *